(12) United States Patent
Yamanishi et al.

(10) Patent No.: US 11,063,279 B2
(45) Date of Patent: Jul. 13, 2021

(54) FUEL CELL SYSTEM

(71) Applicant: TOYOTA JIDOSHA KABUSHIKI KAISHA, Toyota (JP)

(72) Inventors: Yuji Yamanishi, Toyota (JP); Yasushi Araki, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 188 days.

(21) Appl. No.: 16/518,327

(22) Filed: Jul. 22, 2019

(65) Prior Publication Data
US 2020/0091529 A1 Mar. 19, 2020

(30) Foreign Application Priority Data

Sep. 18, 2018 (JP) .............................. JP2018-173622

(51) Int. Cl.
| | | |
|---|---|---|
| H01M 8/04 | (2016.01) | |
| H01M 8/04701 | (2016.01) | |
| H01M 8/04007 | (2016.01) | |
| H01M 8/04746 | (2016.01) | |
| H01M 8/0438 | (2016.01) | |
| H01M 8/04082 | (2016.01) | |
| H01M 8/0432 | (2016.01) | |

(52) U.S. Cl.
CPC ... *H01M 8/04708* (2013.01); *H01M 8/04074* (2013.01); *H01M 8/04201* (2013.01); *H01M 8/04373* (2013.01); *H01M 8/04425* (2013.01); *H01M 8/04753* (2013.01)

(58) Field of Classification Search
CPC ......... H01M 8/04708; H01M 8/04074; H01M 8/04201; H01M 8/04373; H01M 8/04425; H01M 8/04753
See application file for complete search history.

(56) References Cited

U.S. PATENT DOCUMENTS

| | | | |
|---|---|---|---|
| 2002/0100518 A1* | 8/2002 | Kuriiwa | F17C 11/005 141/4 |
| 2003/0146214 A1 | 8/2003 | Idoguchi | |
| 2005/0130002 A1* | 6/2005 | Kuriiwa | H01M 8/04208 429/437 |
| 2009/0095016 A1* | 4/2009 | Schmidt-Ihn | H01M 8/04201 62/601 |
| 2013/0037165 A1 | 2/2013 | Okawachi et al. | |
| 2014/0130896 A1 | 5/2014 | Mayr | |

FOREIGN PATENT DOCUMENTS

| | | |
|---|---|---|
| JP | 2002-340298 A | 11/2002 |
| JP | 2005-053358 A | 3/2005 |
| JP | 2011-231799 A | 11/2011 |
| JP | 2013-217497 A | 10/2013 |

* cited by examiner

Primary Examiner — Jimmy Vo
(74) Attorney, Agent, or Firm — Dickinson Wright, PLLC

(57) ABSTRACT

A fuel cell system includes: a first tank and a second tank each accumulating a fuel gas to be supplied to a fuel cell; a heating device disposed in a passage connecting the first tank and the second tank; and a controller configured to bring the heating device into operation so that the fuel gas flowing from one of the first tank and the second tank to the other of the first tank and the second tank through the heating device is heated when a condition for a temperature of the fuel gas in the first tank or a condition for a temperature of the fuel gas in the second tank is satisfied.

16 Claims, 20 Drawing Sheets

PARALLEL CONNECTION

SERIES CONNECTION #1

SERIES CONNECTION #2

FIG. 20

|  | DURING FILLING | DURING OPERATION |
|---|---|---|
| CONTROL VALVE 3b | CLOSE | OPEN |
| FILLING VALVE 62 | OPEN | CLOSE |

FUEL CELL SYSTEM

CROSS-REFERENCE TO RELATED APPLICATION

This application is based upon and claims the benefit of priority of the prior Japanese Patent Application No. 2018-173622, filed on Sep. 18, 2018, the entire contents of which are incorporated herein by reference.

TECHNICAL FIELD

The present disclosure relates to a fuel cell system.

BACKGROUND

A tank for a fuel gas to be supplied to a fuel cell has a structure in which the outer peripheral surface of a gas impermeable liner is covered with a reinforcement layer for securing pressure resistance, for example. The reinforcement layer is structured by winding carbon fiber reinforced plastic (CFRP), which is formed by, for example, filament winding, around the outer peripheral surface of the liner.

For example, when the liner is made of resin, which is inexpensive, and the temperature of the tank decreases as the remaining amount of the fuel gas decreases, the liner shrinks, and a gap may be formed between the liner and the reinforcement layer due to the difference in linear expansion coefficient between the liner and the CFRP. When the fuel gas is filled into the tank after the gap is formed, the liner deforms so as to fill the gap. Thus, a load may be applied to the linear.

For example, Japanese Patent Application Publication No. 2011-231799 describes that the deformation rate of the liner is reduced to reduce the load on the liner by limiting the flow rate at which the fuel gas is filled into the tank.

SUMMARY

It is therefore an object of the present disclosure to provide a fuel cell system that inhibits a gap from being formed between a liner and a reinforcement layer of a tank.

The above object is achieved by a fuel cell system including: a first tank and a second tank each accumulating a fuel gas to be supplied to a fuel cell; a heating device disposed in a passage connecting the first tank and the second tank; and a controller configured to bring the heating device into operation so that the fuel gas flowing from one of the first tank and the second tank to the other of the first tank and the second tank through the heating device is heated when a condition for a temperature of the fuel gas in the first tank or a condition for a temperature of the fuel gas in the second tank is satisfied.

In the above fuel system, the controller may be configured to: when the condition for the temperature of the fuel gas in the first tank and the condition for the temperature of the fuel gas in the second tank are not satisfied, switch a supply path of the fuel gas to the fuel cell to a path along which the fuel gas flows from the first tank and the second tank to the fuel cell without passing through the heating device, and stop operation of the heating device, and when the condition for the temperature of the fuel gas in the first tank or the condition for the temperature of the fuel gas in the second tank is satisfied, switch the supply path to a path along which the fuel gas flows from one of the first tank and the second tank to the other of the first tank and the second tank through the heating device and reaches the fuel cell, and bring the heating device into operation.

In the above fuel cell system, the fuel cell system may further include: a first control valve disposed in a passage that supplies the fuel gas from the first tank to the fuel cell without passing through the heating device; and a second control valve disposed in a passage that supplies the fuel gas from the second tank to the fuel cell without passing through the heating device, and the controller may be configured to, when the condition for the temperature of the fuel gas in the first tank and the condition for the temperature of the fuel gas in the second tank are not satisfied, open the first control valve and the second control valve, and when the condition for the temperature of the fuel gas in the first tank or the condition for the temperature of the fuel gas in the second tank is satisfied, close the first control valve and open the second control valve so that the fuel gas flows from the first tank to the second tank through the heating device.

In the above fuel cell system, the fuel cell system may further include: a first temperature sensor configured to detect a first temperature of the fuel gas in the first tank; and a second temperature sensor configured to detect a second temperature of the fuel gas in the second tank, and the controller may be configured to, when a temperature difference, which is obtained by subtracting the first temperature from the second temperature, exceeds a first standard value after the first control valve is closed and the second control valve is opened, open the first control valve and close the second control valve so that the fuel gas flows from the second tank to the first tank through the heating device.

In the above fuel cell system, the controller may be configured to, when a temperature difference, which is obtained by subtracting the second temperature from the first temperature, exceeds the first standard value after the first control valve is opened and the second control valve is closed, close the first control valve and open the second control valve so that the u gas flows from the first tank to the second tank through the heating device.

In the above fuel cell system, the controller may be configured to, when the temperature difference, which is obtained by subtracting the first temperature from the second temperature, becomes below a second standard value after the first control valve is opened and the second control valve is closed, close the first control valve and opens the second control valve so that the fuel gas flows from the first tank to the second tank through the heating device, the second standard value being less than the first standard value.

In the above fuel cell system, the fuel cell system may further include a pressure sensor detecting a pressure of the fuel gas in the first tank and the second tank, and the controller may be configured to, when an amount of decrease in a pressure detected by the pressure sensor exceeds a standard value after the first control valve is closed and the second control valve is opened, open the first control valve and close the second control valve so that the fuel gas flows from the second tank to the first tank through the heating device.

In the above fuel cell system, the controller may be configured to, when the amount of decrease in the pressure detected by the pressure sensor exceeds the standard value after the first control valve is opened and the second control valve is closed, close the first control valve and open the second control valve so that the fuel gas flows from the first tank to the second tank through the heating device.

In the above fuel cell system, the fuel cell system may further include a current sensor that detects a current value output from the fuel cell, and the controller may be configured to, when an integrated value of the current value detected by the current sensor exceeds a standard value after the first control valve is closed and the second control valve is opened, open the first control valve and close the second control valve so that the fuel gas flows from the second tank to the first tank through the heating device.

In the above fuel cell system, the controller may be configured to, when the integrated value of the current value detected by the current sensor exceeds the standard value after the first control valve is opened and the second control valve is closed, close the first control valve and open the second control valve so that the fuel gas flows from the first tank to the second tank through the heating device.

In the above fuel cell system, the controller may be configured to, when the temperature of the fuel gas in the first tank or the temperature of the fuel gas in the second tank is equal to or less than a threshold value corresponding to a remaining amount of the fuel gas, determine that the condition is satisfied.

In the above fuel cell system, the controller may be configured to, when a consumption rate of the fuel gas in the first tank or a consumption rate of the fuel gas in the second tank is equal to or less than a threshold value corresponding to a remaining amount of the fuel gas, determine that the condition is satisfied.

In the above fuel cell system, each of the first tank and the second tank may include a liner made of resin, each of the first tank and the second tank may have a shape extending in one direction, and a length of the first tank in the one direction may be greater than a length of the second tank in the one direction.

In the above fuel cell system, the first tank may include a liner made of metal, and the second tank may include a liner made of resin.

In the above fuel cell system, the heating device may be a heat exchanger including a cooling passage through which a cooling medium that has cooled the fuel cell flows.

In the above fuel cell system, the heating device may be a heat exchanger including a fan and a fin.

BRIEF DESCRIPTION OF THE DRAWINGS

FIG. 20 presents examples of open/close states of a control valve and a filling valve.

DETAILED DESCRIPTION

When the flow rate at which a fuel gas is filled into a tank is limited, the amount of time for filling increases. Therefore, to reduce the load on the liner, it is important to prevent a gap sufficient for the liner to deform from being formed between the liner and the reinforcement layer of the tank.

First Embodiment

Figure 1:
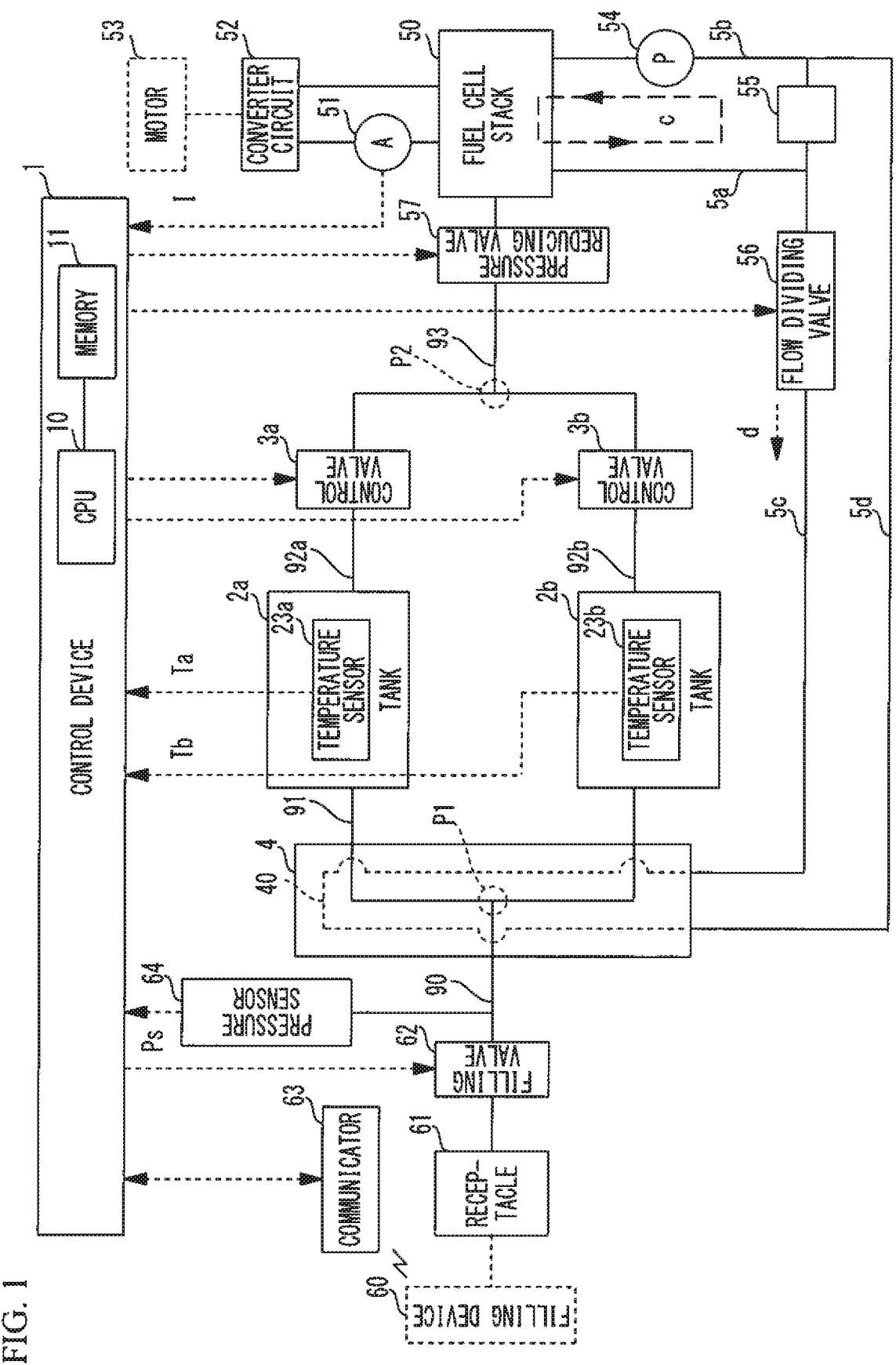
FIG. 1 is a block diagram of a fuel cell system of a first embodiment.

FIG. 1 is a block diagram of a fuel cell system of a first embodiment. The fuel cell system includes a control device 1, a pair of tanks 2a and 2b, a pair of control valves 3a and 3b, a heat exchanger 4, a fuel cell stack 50, a current sensor 51, a converter circuit 52, a pump 54, a radiator 55, a flow dividing valve 56, a pressure reducing valve 57, a receptacle 61, a filling valve 62, a communicator 63, and a pressure sensor 64.

The fuel cell system also includes a filling passage 90, a tank connecting passage 91, a pair of supply system connecting passages 92a and 92b, and a fuel supply passage 93 as pipes through which a fuel gas such as a hydrogen gas flows. Furthermore, the fuel cell system includes a cooling water discharge passage 5a, a cooling water supply passage 5b, and cooling water dividing passages 5c and 5d as pipes through which cooling water, which is an example of a cooling medium of the fuel cell stack 50, flows.

The filling passage 90 is coupled to the receptacle 61, the filling valve 62, and the tank connecting passage 91. The receptacle 61 is to be connected to a fuel gas filling device 60 installed in, for example, a hydrogen station. The filling device 60 fills the fuel gas into each tank 2a, 2b from the filling passage 90 through the receptacle 61.

The filling valve 62 is disposed in the filling passage 90, and opens and closes according to the control by the control device 1. The filling valve 62 is opened when the fuel gas is filled into the tanks 2a and 2b, and is closed otherwise.

The control device 1 is, for example, an electronic control unit (ECU), and includes a central processing unit (CPU) 10 and a memory 11. The memory 11 stores a program for controlling the operation of the fuel cell system and various parameters. The CPU 10 reads a program in the memory 11 when started, and executes the operation defined in the program. The memory 11 includes, for example, a random access memory (RAM) and a read only memory (ROM).

The control device 1 communicates with the filling device 60 through the communicator 63. The communicator 63 includes a communication circuit that processes, for example, infrared communication. The control device 1 controls the filling valve 62 and the like in cooperation with the filling device 60 through the communication with the filling device 60.

The downstream-most portion of the filling passage 90 is coupled to the middle of the tank connecting passage 91 as indicated by reference character P1. The tank connecting passage 91 is a passage connecting the tanks 2a and 2b. A first end of the tank connecting passage 91 is connected to the tank 2a, and a second end of the tank connecting passage 91 is connected to the tank 2b. The fuel gas passes through the tank connecting passage 91 from the filling passage 90, and is then filled into each tank 2a, 2b.

The pressure sensor 64 is disposed in the filling passage 90, The pressure sensor 64 detects the pressure in the filling passage 90. When the filling valve 62 is closed, the pressure in the filling passage 90 is equal to the pressure in the tank connecting passage 91. Thus, the pressure sensor 64 is able to detect the pressures of the fuel gases in the tanks 2a and 2b, The control device 1 obtains the pressure detected by the pressure sensor 64, and uses the obtained pressure for various controls.

The tanks 2a and 2b are respectively examples of a first tank and a second tank, and accumulate the fuel gas. The fuel gas in each tank 2a, 2b is supplied to the fuel cell stack 50 through the fuel supply passage 93, and is used by the fuel cell stack 50 to generate electric power, Since the fuel cell system includes a plurality of the tanks 2a and 2b, the duration of power generation of the fuel cell stack 50 until the fuel gas is filled is extended.

The supply system connecting passage 92a is an example of a passage that supplies the fuel gas from the tank 2a to the fuel cell stack 50 without passing through the heat exchanger 4, and the supply system connecting passage 92b is an example of a passage that supplies the fuel gas from the tank 2b to the fuel cell stack 50 without passing through the heat exchanger 4. First ends of the supply system connecting passages 92a and 92b are connected to the tanks 2a and 2b, respectively, and second ends of the supply system connecting passages 92a and 92b are connected to a first end of the fuel supply passage 93 indicated by reference character P2. The supply system connecting passages 92a and 92b respectively connect the tanks 2a and 2b to the fuel supply passage 93.

The control valves 3a and 3b are disposed in the supply system connecting passages 92a and 92b, respectively. The control valves 3a and 3b open and close according to the control by the control device 1. The control valves 3a and 3b are closed during filling of the fuel gas into the tanks 2a and 2b.

The control device 1 controls the opening/closing of the control valves 3a and 3b to switch the supply path of the fuel gas to the fuel cell when the fuel gas is supplied from the tank 2a or 2b to the fuel cell stack 50. More specifically, as described later, the control device 1 switches the path for the fuel gas by switching the connection configuration between the tanks 2a and 2b and the fuel cell stack 50.

The pressure reducing valve 57 is disposed in the fuel supply passage 93. The control device 1 controls the degree of opening of the pressure reducing valve 57. Accordingly, the supplied amount of the fuel gas to the fuel cell stack 50 is adjusted in accordance with, for example, the output (electric power) requested from the fuel cell stack 50.

The fuel cell stack 50 generates electric power by chemical reaction between a fuel gas supplied to an anode and an oxidant gas such as air supplied to a cathode. The fuel cell stack 50 includes a plurality of fuel cells that are stacked. The fuel supply passage 93 is connected to the anode of the fuel cell. The supply passage of the oxidant gas, which is not illustrated, is connected to the cathode of the fuel cell.

The fuel cell stack 50 is electrically connected to the current sensor 51 and the converter circuit 52. The converter circuit 52 includes, for example, a direct current-direct current (DC-DC) converter and an inverter. The current sensor 51 detects the current value I output from the fuel cell stack 50. The control device 1 obtains the current value I detected by the current sensor 51, and uses the obtained current value I for various controls. The electric power generated by the fuel cell stack 50 is supplied from the converter circuit 52 to a motor 53 when the fuel cell system is mounted on a fuel cell vehicle.

The cooling water discharge passage 5a and the cooling water supply passage 5b are connected to the fuel cell stack 50 to cool the fuel cell stack 50. First ends of the cooling water discharge passage 5a and the cooling water supply passage 5b are connected to the fuel cell stack 50, and second ends are connected to the radiator 55.

High-temperature cooling water used to cool the fuel cell stack 50 is discharged from the fuel cell stack 50 to the cooling water discharge passage 5a, and flows into the radiator 55. The radiator 55 cools the cooling water from the cooling water discharge passage 5a, and discharges the cooled cooling water to the cooling water supply passage 5b.

The pump 54 is disposed in the cooling water supply passage 5b. The pump 54 pumps, to the fuel cell stack 50, the low-temperature cooling water discharged to the cooling water supply passage 5b. Accordingly, as indicated by reference character c, the cooling water circulates between the fuel cell stack 50 and the radiator 55.

Temperature sensors 23a and 23b are disposed in the tanks 2a and 2b, respectively. The temperature sensors 23a and 23b detect the temperatures of the fuel gases in the tanks 2a and 2b, respectively. The control device 1 obtains the temperatures detected by the temperature sensors 23a and 23b disposed in the tanks 2a and 2b to use them for various controls. The temperature sensor 23a in the tank 2a is an example of a first temperature sensor, and the temperature sensor 23b in the tank 2b is an example of a second temperature sensor.

The structure of the tanks 2a and 2b will be described.

Figure 2:
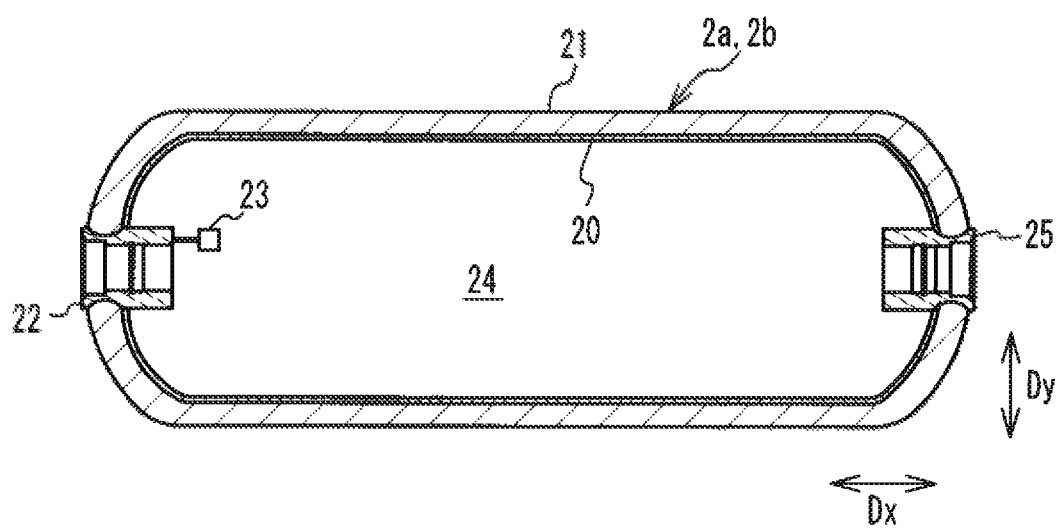
FIG. 2 is a cross-sectional view of an exemplary tank.

FIG. 2 is a cross-sectional view illustrating the tanks 2a and 2b. Each of the tanks 2a and 2b has a liner 20, a reinforcement layer 21, and a pair of mouthpieces 22 and 25. Each tank 2a, 2b has a shape extending in a direction Dx, and the length thereof in the direction Dx is longer than the length thereof in a direction Dy perpendicular to the direction Dx.

The liner 20 is formed to have a hollow structure so that a storage space 24 for the fuel gas is secured inside each tank 2a, 2b. The liner 20 has a gas barrier property, and inhibits the fuel gas from passing therethrough to the outside. The liner 20 is made of resin. Examples of the resin include, but are not limited to, polyethylene resin, polypropylene resin, and other hard resins.

The mouthpieces 22 and 25 communicate the storage space 24 with external pipes. The mouthpiece 22 is connected to one end of the tank connecting passage 91, and the mouthpiece 25 is connected to the supply system connecting passage 92a or 92b. The fuel gas flows from the storage space 24 to the tank connecting passage 91 through the mouthpiece 22 and to the supply system connecting passage 92a or 92b through the mouthpiece 25.

The reinforcement layer 21 is formed so as to cover the outer peripheral surface of the liner 20. The reinforcement layer 21 has a resistance to the pressure of the fuel gas stored inside each tank 2a, 2b. The reinforcement layer 21 is obtained by, for example, winding a fiber containing matrix resin around the outer surface of the liner 20 and then curing the matrix resin. Examples of the matrix resin include, but are not limited to, epoxy resin and modified epoxy resin, and examples of the fiber include, but are not limited to, a carbon fiber and aramid resin. Examples of the method of winding the fiber include, but are not limited to, a filament winding method and a tape winding method, and helical winding and hoop winding are used together.

For example, the reinforcement layer 21 made of carbon fiber reinforced plastics (CFRP) is formed by using a filament winding method for the liner 20 made of resin. When the reinforcement layer 21 is made of CFRP, thermosetting epoxy resin is used as the matrix resin, and a carbon fiber is used as the fiber. The reinforcement layer 21 may include glass fiber reinforced plastics (GFRP) stacked on the outer surface of the CFRP layer in addition to the CFRP layer stacked on the outer peripheral surface of the liner 20.

Figure 3:
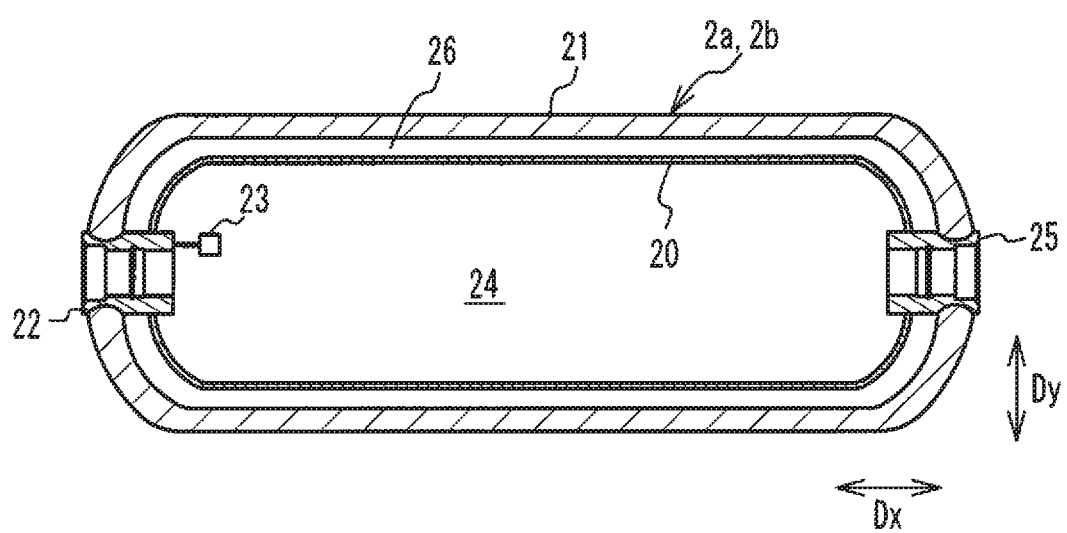
FIG. 3 is a cross-sectional view of the tank in which a gap is formed between a liner and a reinforcement layer.

FIG. 3 is a cross-sectional view of an example of each tank 2a, 2b when a gap 26 is formed between the liner 20 and the reinforcement layer 21. As understood by comparison with FIG. 2, the gap 26 is formed between the liner 20 and the reinforcement layer 21. The gap 26 is formed because of the following reasons.

The liner 20 and the reinforcement layer 21 have different linear expansion coefficients. Thus, the liner 20 is likely to shrink more than the reinforcement layer 21. Thus, when the temperature of the fuel gas in each tank 2a, 2b decreases, the reinforcement layer 21 does not substantially shrink, but the liner 20 shrinks, and thereby the gap 26 is formed. When the fuel gas is filled into each tank 2a, 2b after the gap 26 is formed, the liner 20 deforms so as to fill the gap 26. Thus, a load may be applied to the liner 20.

The temperature of the fuel gas decreases as the remaining amount of the fuel gas in each tank 2a, 2b decreases as the fuel gas is supplied to the fuel cell stack 50. Thus, as the consumed amount of the fuel gas increases, the temperature of the fuel gas in each tank 2a, 2b decreases, and the gap 26 may be formed.

Thus, as illustrated in FIG. 1, the heat exchanger 4 is disposed in the tank connecting passage 91 between the tanks 2a and 2b, and the control device 1 brings the heat exchanger 4 into operation so that the fuel gas flowing from one of the tanks 2a and 2b to the other of the tanks 2a and 2b through the heat exchanger 4 is heated when a control condition for the temperature of the fuel gas in the tank 2a or 2b is satisfied.

In this case, the control device 1 opens and closes the control valves 3a and 3b so that the fuel gas flows from one of the tanks 2a and 2b to the other of the tanks 2a and 2b. Thus, the fuel gas heated by the heat exchanger 4 flows from one of the tanks 2a and 2b to the other of the tanks 2a and 2b. Accordingly, decrease in the temperature of the fuel gas in the tank 2a or 2b into which the fuel gas flows is reduced, and the formation of the gap 26 is thereby inhibited.

The heat exchanger 4 is an example of a heating device. The heating device is not limited to the heat exchanger 4, and may be a heater. The way of heat exchange of the heat exchanger 4 is not limited. In the present embodiment, the heat exchanger 4 uses, for example, the cooling water of the fuel cell stack 50 for heat exchange. Thus, the heat exchanger 4 includes a cooling passage 40 through which the cooling water that has cooled the fuel cell stack 50 flows.

First and second ends of the cooling passage 40 are coupled to the cooling water dividing passages 5c and 5d, respectively. The cooling water diverging from the cooling water discharge passage 5a flows through the cooling water dividing passages 5c and 5d. The cooling water of which the temperature has become high because of the cooling of the fuel cell stack 50 flows through the cooling water dividing passage 5c, and then flows into the cooling passage 40 as indicated by reference character d. The cooling passage 40 is wound around the periphery of the tank connecting passage 91 so that heat is exchanged between the high-temperature cooling water and the low-temperature fuel gas.

The cooling water of which the temperature has become low because of the heat exchange flows from the cooling passage 40 into the cooling water supply passage 5b through the cooling water dividing passage 5d. In this case, the cooling water flows into the upstream side of the pump 54.

The flow dividing valve 56 is disposed in the cooling water dividing passage 5c. The flow dividing valve 56 opens and closes according to the control by the control device 1. The control device 1 opens the flow dividing valve 56 when bringing the heat exchanger 4 into operation, and closes the flow dividing valve 56 when stopping the heat exchanger 4.

As described above, the heat exchanger 4 uses the cooling water of the fuel cell stack 50 for heat exchange. The higher the output of the fuel cell stack 50 is, the higher the temperature of the cooling water becomes because the amount of heat generation of the fuel cell stack 50 increases. In addition, the higher the output of the fuel cell stack 50 is, the larger the consumed amount of the fuel gas is. Thus, as the consumed amount of the fuel gas increases, the temperature of the cooling water in the cooling passage 40 increases. Accordingly, the temperature decrease due to the decrease in the remaining amount of the fuel gas in each tank 2a, 2b is effectively reduced.

The control device 1 controls the control valves 3a and 3b and the heat exchanger 4 so that the fuel gas flows from one of the tanks 2a and 2b to the tank connecting passage 91, is heated by the heat exchanger 4, and then flows into the other of the tanks 2a and 2b. The control device 1 switches the connection configuration of the tanks 2a and 2b to one of a parallel connection, a series connection #1, and a series connection #2 according to the control condition described later by controlling the opening and closing of the control valves 3a and 3b.

Figure 4:
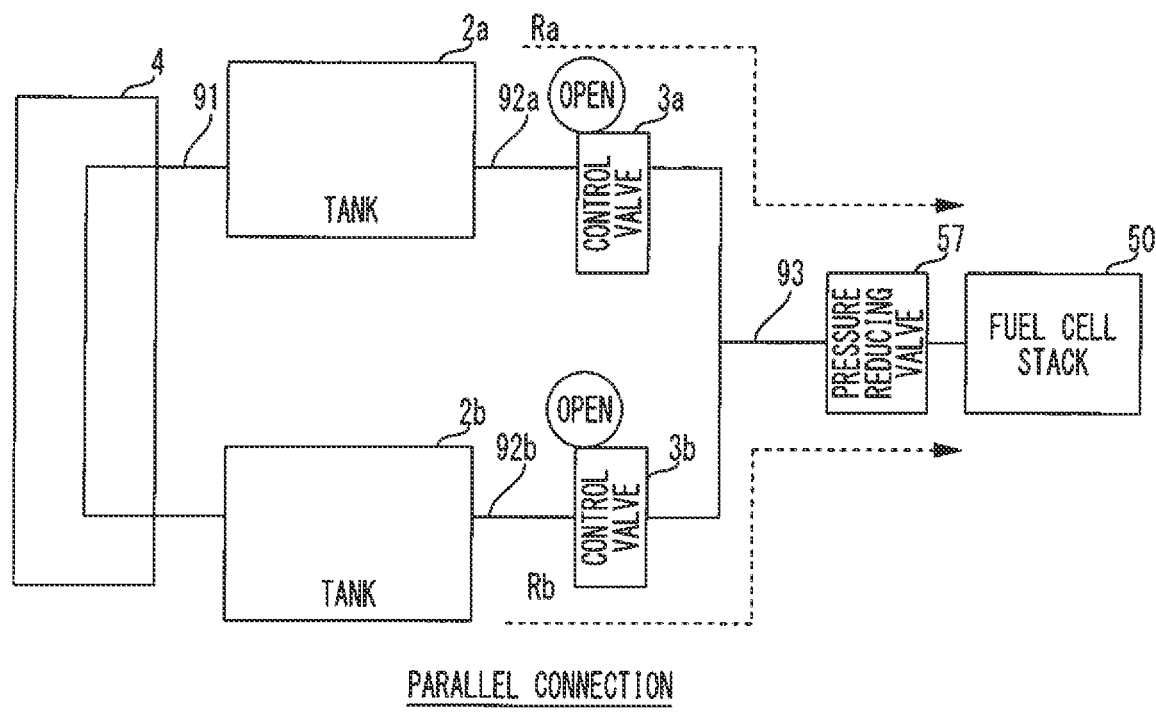
FIG. 4 illustrates a parallel connection of tanks.

FIG. 4 illustrates the parallel connection of the tanks 2a and 2b. FIG. 4 illustrates only the tanks 2a and 2b, the control valves 3a and 3b, the heat exchanger 4, the pressure reducing valve 57, and the fuel cell stack 50 of the fuel cell system illustrated in FIG. 1. The illustration of the filling valve 62 is omitted, but the filling valve 62 is closed.

When the control condition is not satisfied, the control device 1 opens the control valves 3a and 3b to connect the tanks 2a and 2b to the fuel cell stack 50 in parallel with each other. In this case, the fuel gas in the tank 2a is supplied to the fuel cell stack 50 through the supply system connecting passage 92a and the fuel supply passage 93 along the path Ra. The fuel gas in the tank 2b is supplied to the fuel cell stack 50 through the supply system connecting passage 92b and the fuel supply passage 93 along the path Rb.

Since the pressures in the tanks 2a and 2b are substantially equal to each other, no fuel gas passes through the tank connecting passage 91. Thus, the control device 1 closes the flow dividing valve 56 so that the heat exchanger 4 does not operate. That is, the control device 1 stops the operation of the heat exchanger 4.

The fuel gases in the tanks 2a and 2b decrease as they are supplied to the fuel cell stack 50. Accordingly, the remaining amount of the fuel gas in each tank 2a, 2b decreases, and the temperature decreases as the pressure decreases. Thus, the control condition is satisfied for at least one of the fuel gases in the tanks 2a and 2b.

Figure 5:
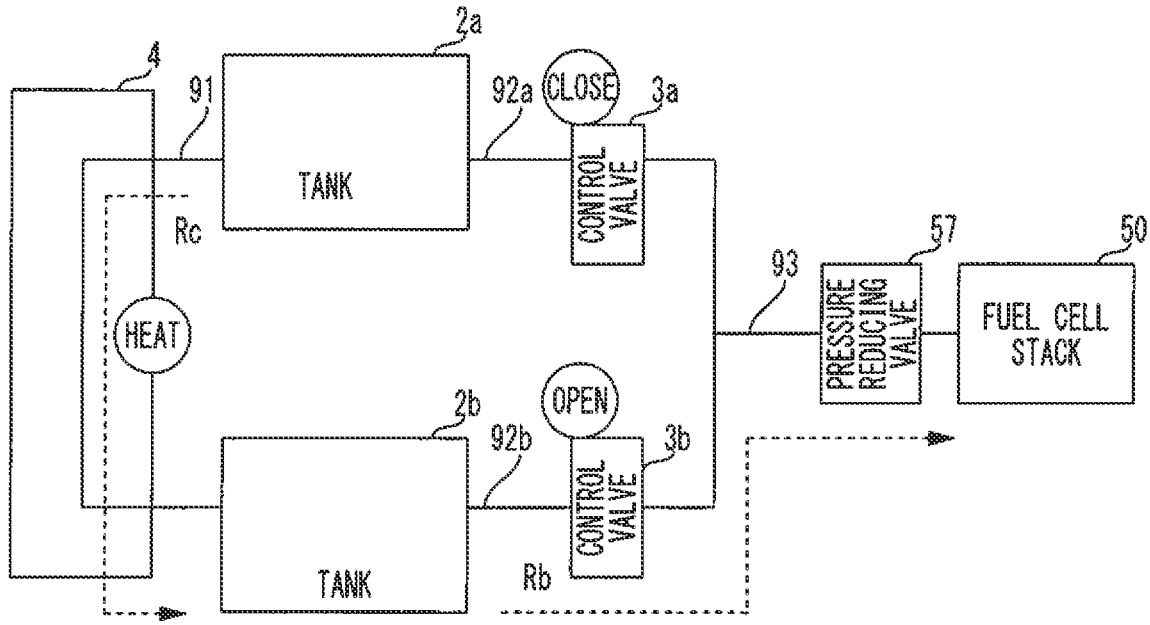
FIG. 5 illustrates a series connection #1 of the tanks and a series connection #2 of the tanks.
Figure 5:
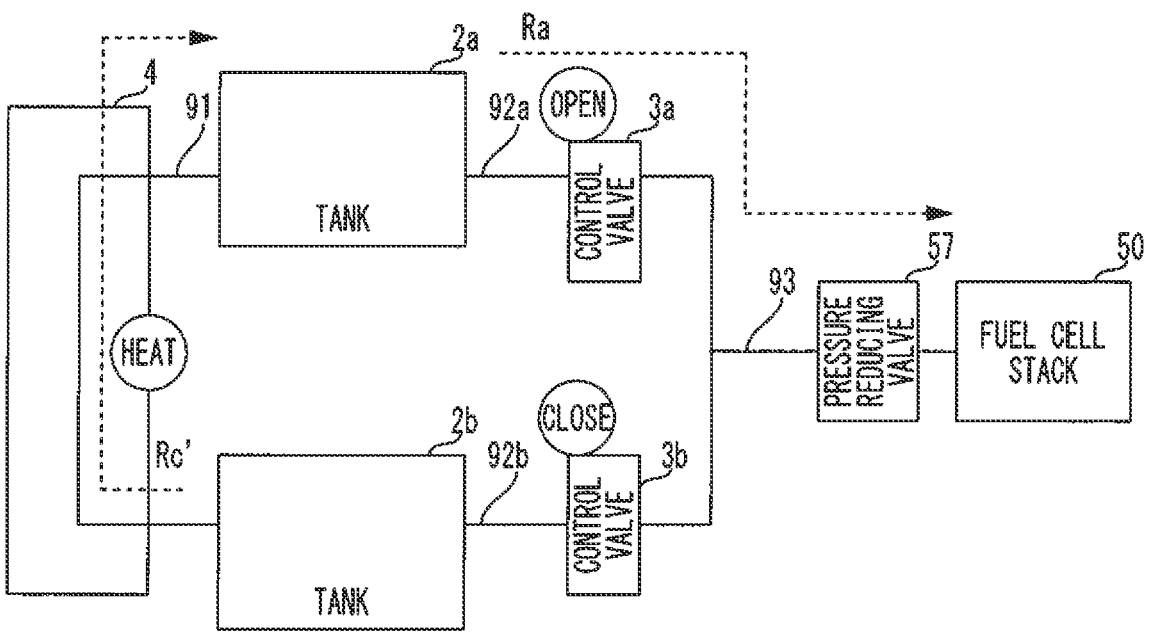

FIG. 5 illustrates the series connections #1 and #2 of the tanks 2a and 2b. FIG. 5 only illustrates the tanks 2a and 2b, the control valves 3a and 3b, the heat exchanger 4, the pressure reducing valve 57, and the fuel cell stack 50 of the fuel cell system illustrated in FIG. 1, Although the illustration of the filling valve 62 is omitted, the filling valve 62 is closed.

When the control condition is satisfied, the control device 1 opens the flow dividing valve 56 so that the heat exchanger 4 operates, and opens only one of the control valves 3a and 3b to connect the tanks 2a and 2b in series with the fuel cell stack 50.

In the case of the series connection #1, the control device 1 closes the control valve 3a and opens the control valve 3b. This causes the pressures in the tanks 2a and 2b to become different, and the fuel gas in the tank 2a flows into the tank 2b through the tank connecting passage 91 along the path Rc. In this case, the tank 2a is located further upstream than the tank 2b in the supply paths Rc and Rb of the fuel gas.

Since the fuel gas in the tank 2b is supplied to the fuel cell stack 50 along the path Rb, the remaining amount of the fuel gas in the tank 2b decreases. However, since the fuel gas in the tank 2a flows into the tank 2b after heated by passing through the heat exchanger 4, decrease in the temperature of the fuel gas in the tank 2b is reduced.

In the case of the series connection #2, the control device 1 closes the control valve 3b and opens the control valve 3a. This causes the pressures in the tanks 2a and 2b to become different, and the fuel gas in the tank 2b flows into the tank 2a through the tank connecting passage 91 along the path Rc'. In this case, the tank 2b is located further upstream than the tank 2a in the supply paths Rc' and Rb of the fuel gas.

Since the fuel gas in the tank 2a is supplied to the fuel cell stack 50 along the path Ra, the remaining amount of the fuel gas in the tank 2a decreases. However, since the fuel gas in the tank 2b flows into the tank 2a after heated by passing through the heat exchanger 4, decrease in the temperature of the fuel gas in the tank 2a is reduced.

As seen above, when the control condition is not satisfied for any of the fuel gases in the tanks 2a and 2b, the control device 1 switches the supply path of the fuel gas to the paths Ra and Rb, along which the fuel gas flows from the tanks 2a and 2b to the fuel cell stack 50 without passing through the heat exchanger 4, and stops the operation of the heat exchanger 4. When the control condition is satisfied for at least one of the fuel gases in the tanks 2a and 2b, the control device 1 switches the supply path of the fuel gas to the paths Rc and Rb, along which the fuel gas flows from the tank 2a to the tank 2b through the heat exchanger 4 and then reaches the fuel cell stack 50, or the paths Rc' and Ra, along which the fuel gas flows from the tank 2b to the tank 2a through the heat exchanger 4 and reaches the fuel cell stack 50, and brings the heat exchanger 4 into operation.

Accordingly, when the control condition is not satisfied, the fuel gas does not pass through the heat exchanger 4. Thus, the fuel gas reaches the fuel cell stack 50 without passing through the long passage in, for example, the heat exchanger 4. Therefore, compared with the case where the fuel gas passes through the heat exchanger 4, the response of the flow volume control of the fuel gas improves.

In any of the series connections #1 and #2, the fuel gas flows from the upstream tank 2a or 2b to the downstream tank 2b or 2a, and the temperature of the fuel gas in the upstream tank 2a or 2b decreases. Thus, the control device 1 alternately switches the connection configuration of the tanks 2a and 2b to the series connection #1 and the series connection #2 according to the temperatures detected by the temperature sensors 23a and 23b. Accordingly, the fuel gases in the tanks 2a and 2b are alternately heated, and thus, decrease in the temperature of the fuel gas is effectively reduced.

For example, when the control condition is satisfied for at least one of the fuel gases in the tanks 2a and 2b, the control device 1 switches the connection configuration of the tanks 2a and 2b from the parallel connection to the series connection #1, and thereafter, alternately switches the connection configuration of the tanks 2a and 2b to the series connections #2 and #1 according to the temperatures of the fuel gases in the tanks 2a and 2b.

Figure 6:
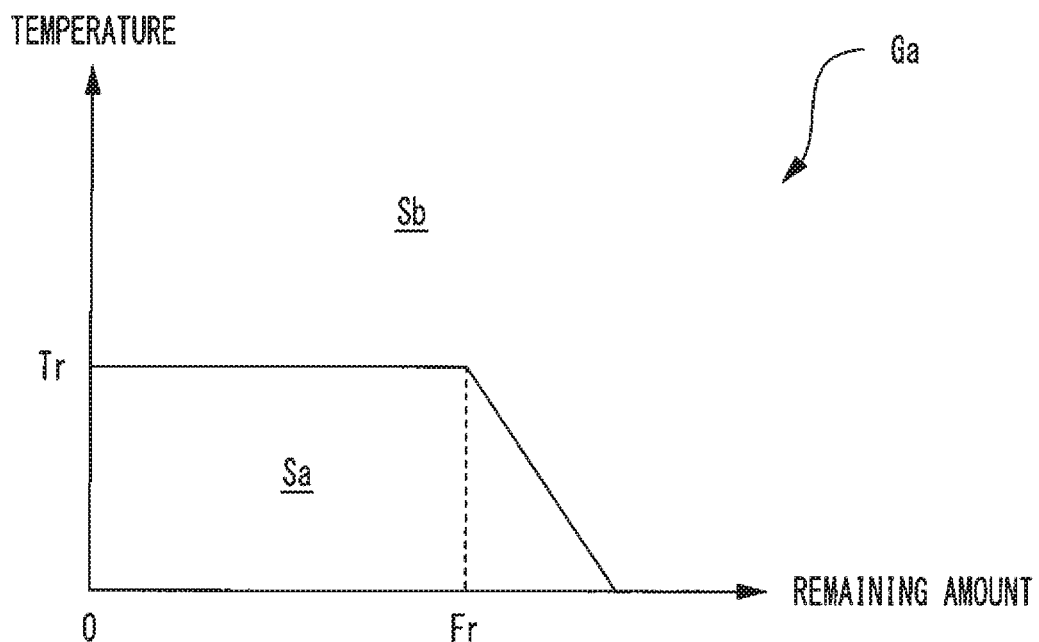
FIG. 6 illustrates an exemplary control condition.
Figure 6:
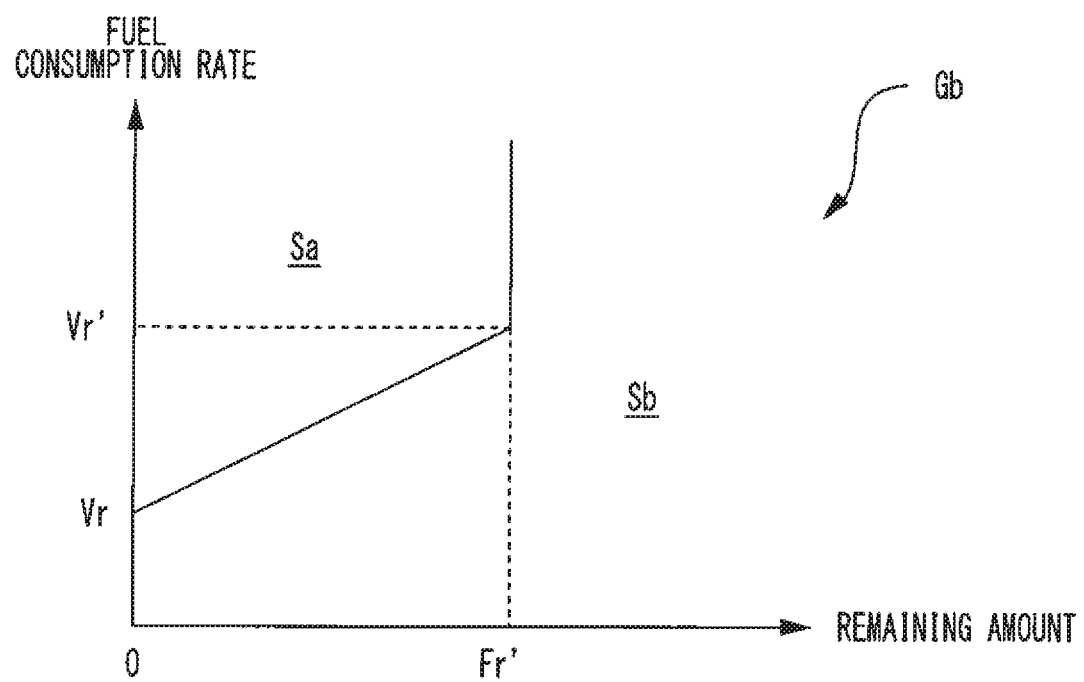

FIG. 6 presents an example of the control condition. The control condition is an example of a condition for the temperature of the fuel gas in the tank 2a and a condition for the temperature of the fuel gas in the tank 2b.

The control device 1 determines the possibility of the formation of the gap 26 due to decrease in the temperature of the fuel gas in each tank 2a, 2b by determining whether the control condition is satisfied. The control condition includes not only the temperature of the fuel gas but also the remaining amount of the fuel gas in each tank 2a, 2b, for example. This is because the smaller the remaining amount of the fuel gas is, the higher the possibility that the fuel gas is filled into the tanks 2a and 2b is, and the higher the need to reduce decrease in the temperature of the fuel gas becomes.

Reference character Ga indicates the relationship between the remaining amount of the fuel gas in each tank 2a, 2b and the temperature thereof. The region Sa is an example of a range in which the control condition is satisfied, and the region Sb is an example of a range in which the control condition is not satisfied. When the remaining amount is equal to or greater than 0 and is equal to or less than the standard amount Fr, and the temperature is equal to or less than a certain threshold value Tr, or when the remaining amount is greater than the standard amount Fr, and the temperature is equal to or less than the threshold value linearly changing with respect to the remaining amount, the control condition is satisfied. Accordingly, when the remaining amount is small and the temperature is low, the control condition is satisfied.

The control device 1 calculates the remaining amount from the pressure detected by the pressure sensor 64, for example, and obtains the temperatures from the temperature sensor 23a and 23b. The relationship between the remaining amount and the temperature indicated by reference character Ga is stored as map data in, for example, the memory 11, and the control device 1 determines whether the control condition is satisfied by applying the calculated remaining amount and the obtained temperature to the map.

As described above, the control device 1 determines that the control condition is satisfied when the temperature of the fuel gas in the tank 2a or 2b is equal to or less than the threshold value corresponding to the remaining amount of the fuel gas. Thus, the control device 1 can determine the possibility of the formation of the gap 26 and the necessity of reducing decrease in the temperature of the fuel gas with high accuracy.

The control device 1 may use the consumption rate of the fuel gas (the fuel consumption rate), instead of the temperature, to determine whether the control condition is satisfied. This is because the higher the fuel consumption rate is, the faster the temperature decreases. That is, the temperature of the fuel gas and the fuel consumption rate correlate.

Reference character Gb indicates the relationship between the remaining amount of the fuel gas in each tank 2a, 2b and the fuel consumption rate. The region Sa is an example of the range in which the control condition is satisfied, and the region Sb is an example of the range in which the control condition is not satisfied. When the remaining amount is equal to or greater than 0 and is equal to or less than the standard amount Fr', and the fuel consumption rate is greater than the threshold value linearly changing with respect to the remaining amount (the range of Vr or greater and Vr' or less), the control condition is satisfied. The higher the fuel consumption rate is, the faster the temperature of the fuel gas in each tank 2a, 2b decreases. Thus, when rapid temperature decrease is expected, the control condition is satisfied.

The control device 1 calculates the fuel consumption rate from, for example, the pressure detected by the pressure sensor 64 and the current value I detected by the current sensor 51. The higher the output of the fuel cell stack 50 is, the higher the fuel consumption rate is. The relationship between the remaining amount and the fuel consumption rate indicated by reference character Gb is stored as map data in the memory 11, for example, and the control device 1 determines whether the control condition is satisfied by applying the remaining amount and the fuel consumption rate to the map.

As described above, the control device 1 determines that the control condition is satisfied when the fuel consumption rate in the tank 2a or 2b is equal to or greater than the threshold value corresponding to the remaining amount of the fuel gas. Thus, the control device 1 determines the possibility of the formation of the gap 26 and the necessity of reducing decrease in the temperature of the fuel gas with high accuracy. The control device 1 may simply determine that the control condition is satisfied when the temperature of the fuel gas in the tank 2a or 2b is equal to or greater than a certain threshold value.

Figure 7:
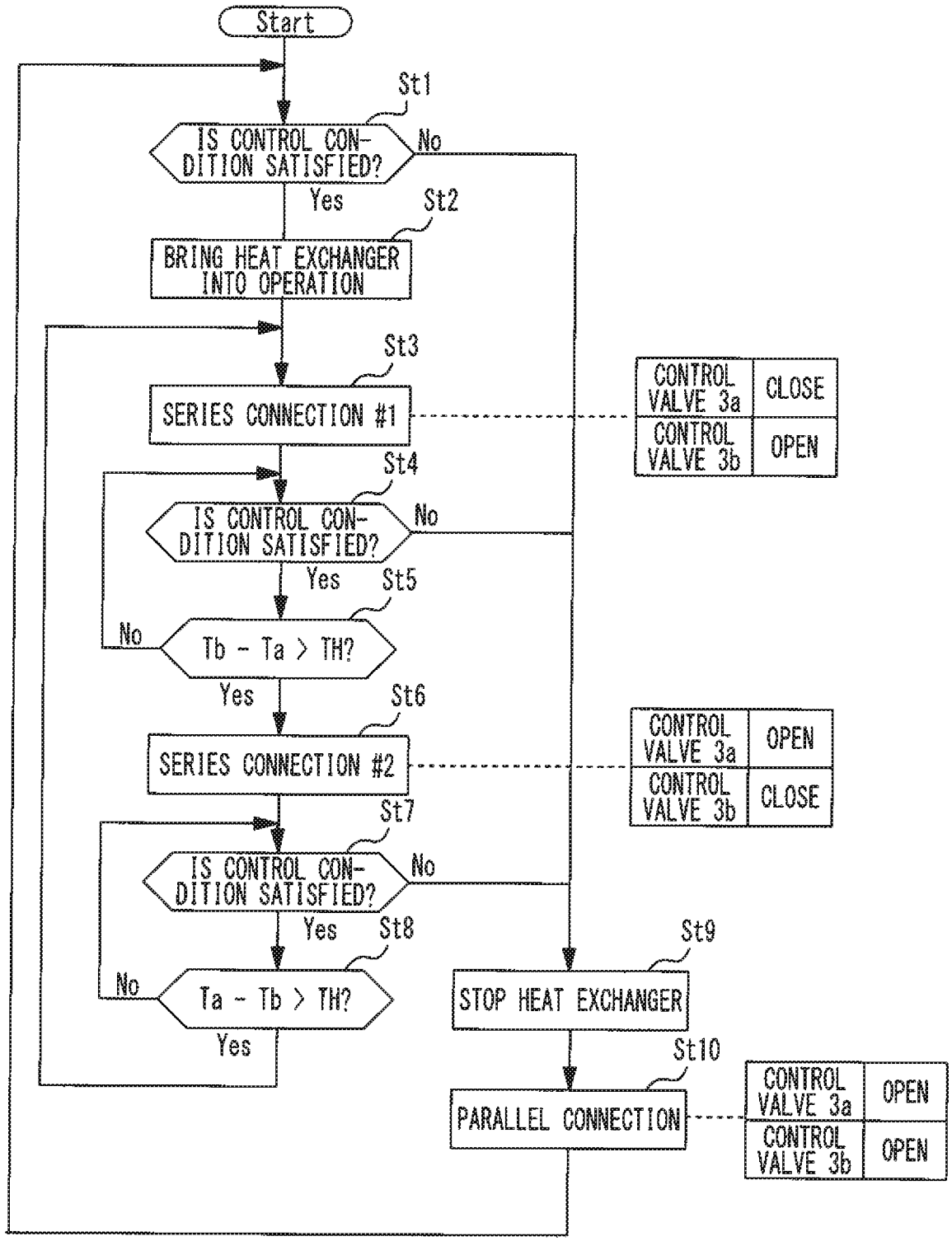
FIG. 7 is a flowchart of an exemplary process executed by a control device during operation of a fuel cell stack.

FIG. 7 is a flowchart of an exemplary process executed by the control device 1 during operation of the fuel cell stack 50. This process is the operation of the program executed by the CPU 10 when the fuel gas is supplied from the tanks 2a and 2b to the fuel cell stack 50. Prior to this process, the control device 1 closes the filling valve 62.

To determine the possibility of the formation of the gap 26 in the tank 2a or 2b, the control device 1 determines whether the control condition is satisfied (step St1). When the control condition is not satisfied (step St1/No), the control device 1 determines that the possibility of the formation of the gap 26 is low, closes the flow dividing valve 56 to stop the heat exchanger 4 (step St9), and opens the control valves 3a and 3b to cause the connection configuration of the tanks 2a and 2b to be the parallel connection (step St10). Thereafter, the process of step St1 is executed again.

When the control condition is satisfied (step St1/Yes), the control device 1 opens the flow dividing valve 56 to bring the heat exchanger 4 into operation (step St2), and closes the control valve 3a and opens the control valve 3b to cause the connection configuration of the tanks 2a and 2b to be the series connection #1 (step St3).

As described above, when the control condition is not satisfied for any one of the fuel gas in the tank 2a and the fuel gas in the tank 2b, the control device 1 opens the control valves 3a and 3b. When the control condition is satisfied for at least one of the fuel gas in the tank 2a and the fuel gas in the tank 2b, the control device 1 closes the control valve 3a and opens the control valve 3b so that the fuel gas flows from the tank 2a to the tank 2b through the heat exchanger 4. Accordingly, due to the opening/closing control of the control valves 3a and 3b, the high-temperature fuel gas flows into the tank 2b, and the fuel gas in the tank 2b is heated. Thus, decrease in the temperature of the fuel gas in the tank 2b is reduced, and the gap 26 is thereby inhibited from being formed in the tank 2b.

Then, the control device t determines again whether the control condition is satisfied (step St4). When the control condition is not satisfied (step St4/No), the control device 1 executes the processes of steps St9 and St10.

When the control condition is satisfied for at least one of the fuel gas in the tank 2a and the fuel gas in the tank 2b (step St4/Yes), the control device 1 compares the temperature difference (Tb−Ta) with a standard value TN (e.g., 5° C.) (step St5). The temperature difference (Tb−Ta) is obtained by subtracting the temperature Ta detected by the temperature sensor 23a of the tank 2a from the temperature Tb (<Ta) detected by the temperature sensor 23b of the tank 2b, When the temperature difference (Tb−Ta) is equal to or less than the standard value TH (step St5/No), the control device 1 executes the process of step St4 again.

When the temperature difference (Tb−Ta) is greater than the standard value TH (step St5/Yes), the control device 1 opens the control valve 3a and closes the control valve 3b to cause the connection configuration of the tanks 2a and 2b to be the series connection #2 (step St6).

As described above, when the temperature difference (Tb−Ta) exceeds the standard value TH after the control valve 3a is closed and the control valve 3b is opened, the control device 1 opens the control valve 3a and closes the control valve 3b so that the fuel gas flows from the tank 2b to the tank 2a through the heat exchanger 4. Accordingly, the high-temperature fuel gas flows into the tank 2a, and the fuel gas in the tank 2a is thereby heated. Thus, decrease in the temperature of the fuel gas in the tank 2a is reduced, and therefore, the formation of the gap 26 in the tank 2a is inhibited. The standard value TH is a positive value, and is an example of a first standard value.

Then, the control device 1 determines again whether the control condition is satisfied (step St7). When the control condition is not satisfied for any one of the fuel gas in the tank 2a and the fuel gas in the tank 2b (step St7/No), the control device 1 executes the processes of the steps St9 and St10.

When the control condition is satisfied for at least one of the fuel gas in the tank 2a and the fuel gas in the tank 2b (step St7/Yes), the control device 1 compares the temperature difference (Ta−Tb) with the standard value TH (step St8). The temperature difference (Ta−Tb) is obtained by subtracting the temperature Tb detected by the temperature sensor 23b of the tank 2b from the temperature Ta detected by the temperature sensor 23a of the tank 2a. When the temperature difference (Ta−Tb) is equal to or less than the standard value TH (step St8/No), the control device 1 executes the process of step St7 again.

When the temperature difference (Ta−Tb) is greater than the standard value TH (step St8/Yes), the control device 1 closes the control valve 3a and opens the control valve 3b to cause the connection configuration between the tanks 2a and 2b and the fuel cell stack 50 to be the series connection #1 (step St3). Accordingly, the temperature of the fuel gas in the tank 2b rises again. Thereafter, the processes from step St4 are executed.

As seen above, when the temperature difference (Ta−Tb) exceeds the standard value TH after the control valve 3a is opened and the control valve 3b is closed, the control device 1 closes the control valve 3a and opens the control valve 3b so that the fuel gas flows from the tank 2a to the tank 2b through the heat exchanger 4. Thus, the high-temperature fuel gas flows into the tank 2b, and the fuel gas in the tank 2b is thereby heated.

Accordingly, decrease in the temperature of the fuel gas in the tank 2b is reduced, and the formation of the gap 26 in the tank 2b is therefore inhibited. In the present process, the control device 1 obtains the temperatures Ta and Tb respectively detected by the temperature sensors 23a and 23b of the tanks 2a and 2b in each of steps St5 and St8. It is assumed that the standard value TH in step St5 and the standard value TH in step St8 are the same, but the standard value TH in step St5 and the standard value TH in step St8 may be different.

As described above, the control device 1 opens and closes the control valves 3a and 3b so that the flow direction of the fuel gas heated by the heat exchanger 4 alternately switches between the direction from the tank 2a to the tank 2b and the direction from the tank 2b to the tank 2a. Thus, the fuel gases in the tanks 2a and 2b are alternately heated.

Figure 8:
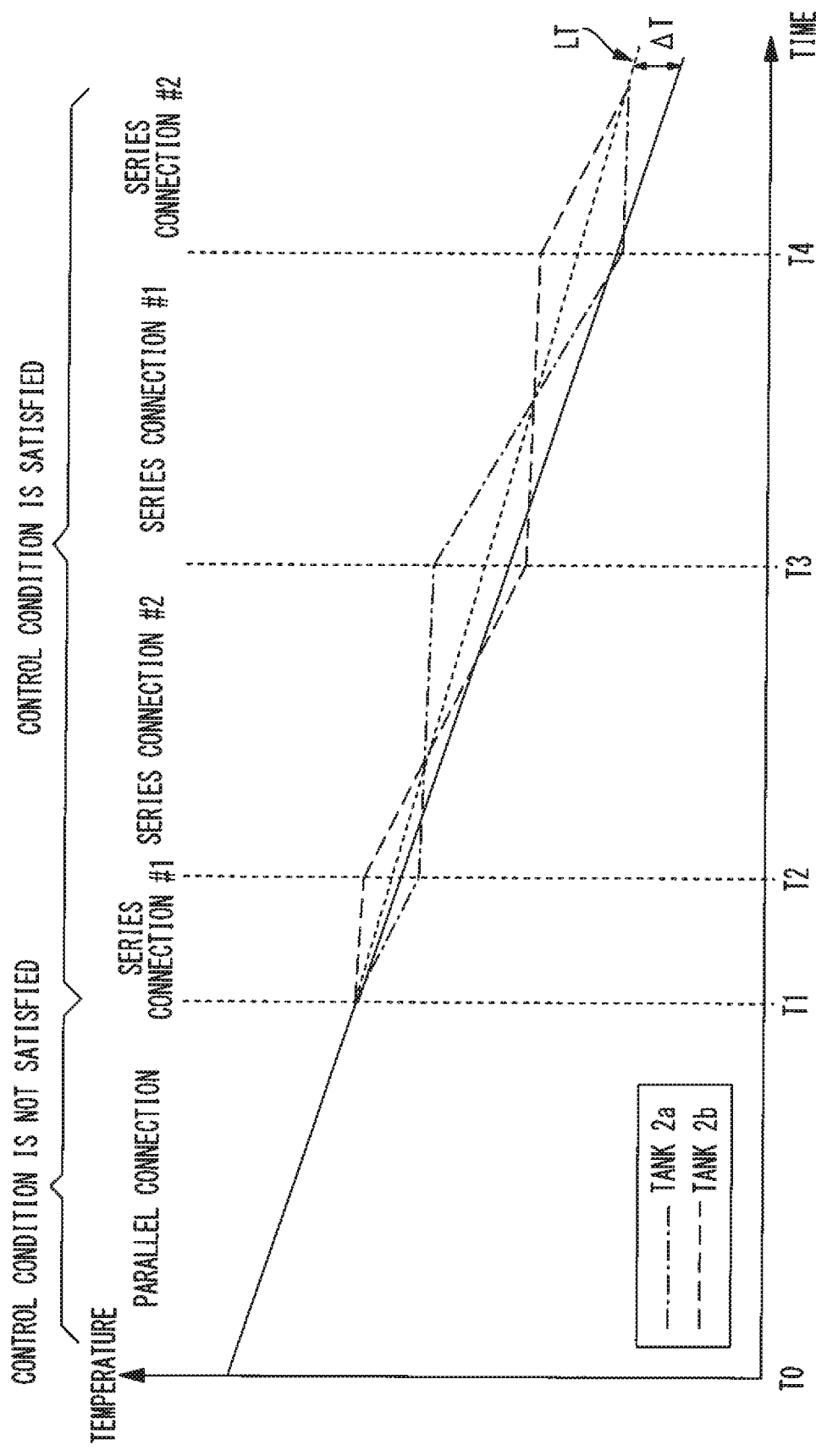
FIG. 8 illustrates a change in temperature of a fuel gas in each tank with respect to time.

FIG. 8 illustrates change in the temperatures of the fuel gases in the tanks 2a and 2b with respect to time. The temperature of the fuel gas changes according to the control by the above-described control device 1.

In the range after time T1, the chain line indicates the temperature of the fuel gas in the tank 2a (i.e., the temperature Ta), and the dashed line indicates the temperature of the fuel gas in the tank 2b (i.e., the temperature Tb). In addition, the solid line indicates the extended line of the line indicating the temperature between the time T0 and time T1. That is, the solid line indicates the slope of decrease in temperature when the connection configuration is the parallel connection. The dotted line LT is a line joining the intersections of the lines of the temperatures of the tanks 2a and 2b, and is considered as the average of the temperatures of the tanks 2a and 2b.

Between time T0 and time T1, since the control condition is not satisfied (see "CONTROL CONDITION IS NOT SATISFIED"), the control device 1 causes the connection configuration of the tanks 2a and 2b to be the parallel connection. Thus, as the remaining amount decreases, the temperatures of the tanks 2a and 2b decrease while keeping equal to each other.

Thereafter, when the control condition is satisfied at time T1 (see "CONTROL CONDITION IS SATISFIED"), the control device 1 causes the connection configuration of the tanks 2a and 2b to be the series connection #1. Accordingly, the fuel gas from the tank 2a is heated by the heat exchanger 4 and then flows into the tank 2b. Thereby, decrease in the temperature of the fuel gas in the tank 2b is reduced. On the other hand, the temperature of the fuel gas of the upstream tank 2a decreases, due to decrease in the remaining amount, at a faster rate than that during the parallel connection.

Thereafter, when determining that the temperature difference (Tb−Ta) between the fuel gases in the tanks 2a and 2b exceeds the standard value TH at time T2, the control device 1 causes the connection configuration of the tanks 2a and 2b to be the series connection #2. Accordingly, the fuel gas from the tank 2b is heated by the heat exchanger 4 and then flows into the tank 2a. Thus, decrease in the temperature of the fuel gas in the tank 2a is reduced. On the other hand, the temperature of the fuel gas in the upstream tank 2b decreases, due to decrease in the remaining amount, at a faster rate than that during the parallel connection.

Thereafter, when determining that the temperature difference (Ta−Tb) between the fuel gases in the tanks 2a and 2b exceeds the standard value TH at time T3, the control device 1 causes the connection configuration of the tanks 2a and 2b to be the series connection #1. Accordingly, decrease in the temperature of the fuel gas in the tank 2b is reduced, and the temperature of the fuel gas in the upstream tank 2a decreases at a faster rate than that during the parallel connection.

Thereafter, when determining that the temperature difference (Tb−Ta) between the fuel gases in the tanks 2a and 2b exceeds the standard value TH at time T4, the control device 1 causes the connection configuration of the tanks 2a and 2b to be the series connection #2. Accordingly, the decrease in the temperature of the fuel gas in the tank 2a is reduced, and the temperature of the fuel gas in the upstream tank 2b decreases at a faster rate than that during the parallel connection. As described above, the magnitude relationship between the temperatures of the fuel gases in the tanks 2a and 2b is controlled so as to be reversed each time the connection configuration is switched.

In the present embodiment, decrease in the temperature of the fuel gas in the tank 2a and decrease in the temperature of the fuel gas in the tank 2b are alternately reduced as described above, Thus, the average value of the temperatures indicated by the dotted line LT is higher than the temperature when the temperature decrease during the parallel connection indicated by the solid line is maintained (see ΔT). Accordingly, the control device 1 reduces decrease in the temperatures of the tanks 2a and 2b. Therefore, the formation of the gap 26 in each tank 2a, 2b is inhibited.

In the present embodiment, the heat exchanger 4 uses the cooling water of the fuel cell stack 50 for heat exchange, but this does not intend to suggest any limitation. The heat exchanger 4 may use ambient air for heat exchange.

Figure 9:
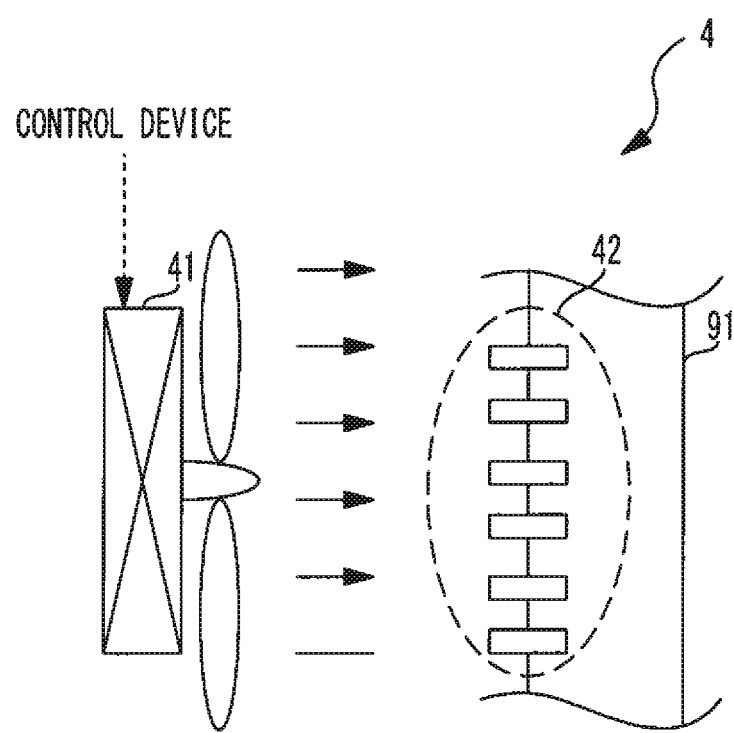
FIG. 9 is a plan view of a variation of a heat exchanger.

FIG. 9 is a plan view illustrating a variation of the heat exchanger 4. The heat exchanger 4 includes a fan 41 and fins 42. The fins 42 are disposed on the surface of the tank connecting passage 91, and the fan 41 is disposed in front of the fins 42, for example.

The fan 41 takes in ambient air and fans the ambient air to the fins 42 as indicated by arrows. The fins 42 absorb the heat of the air, and exchange heat with the fuel gas in the tank connecting passage 91. Accordingly, the fuel gas is heated.

The control device 1 controls the operation and stop of the heat exchanger 4 by turning on and off the motor (not illustrated) for rotating the fan 41.

As described above, since the heat exchanger 4 includes the fan 41 and the fins 42, unlike the case where the cooling water of the fuel cell stack 50 is used, the need for arranging the cooling passages 40 and the cooling water dividing passages 5c and 5d is eliminated, and the heat exchange is achieved with a simple structure.

In the above-described embodiment, the control device 1 switches the connection configuration of the tanks 2a and 2b on the basis of the temperatures Ta and Tb detected by the temperature sensors 23a and 23b, but this does not intend to suggest any limitation. As described in the following example, the connection configuration may be switched on the basis of the pressure Ps detected by the pressure sensor 64.

Figure 10:
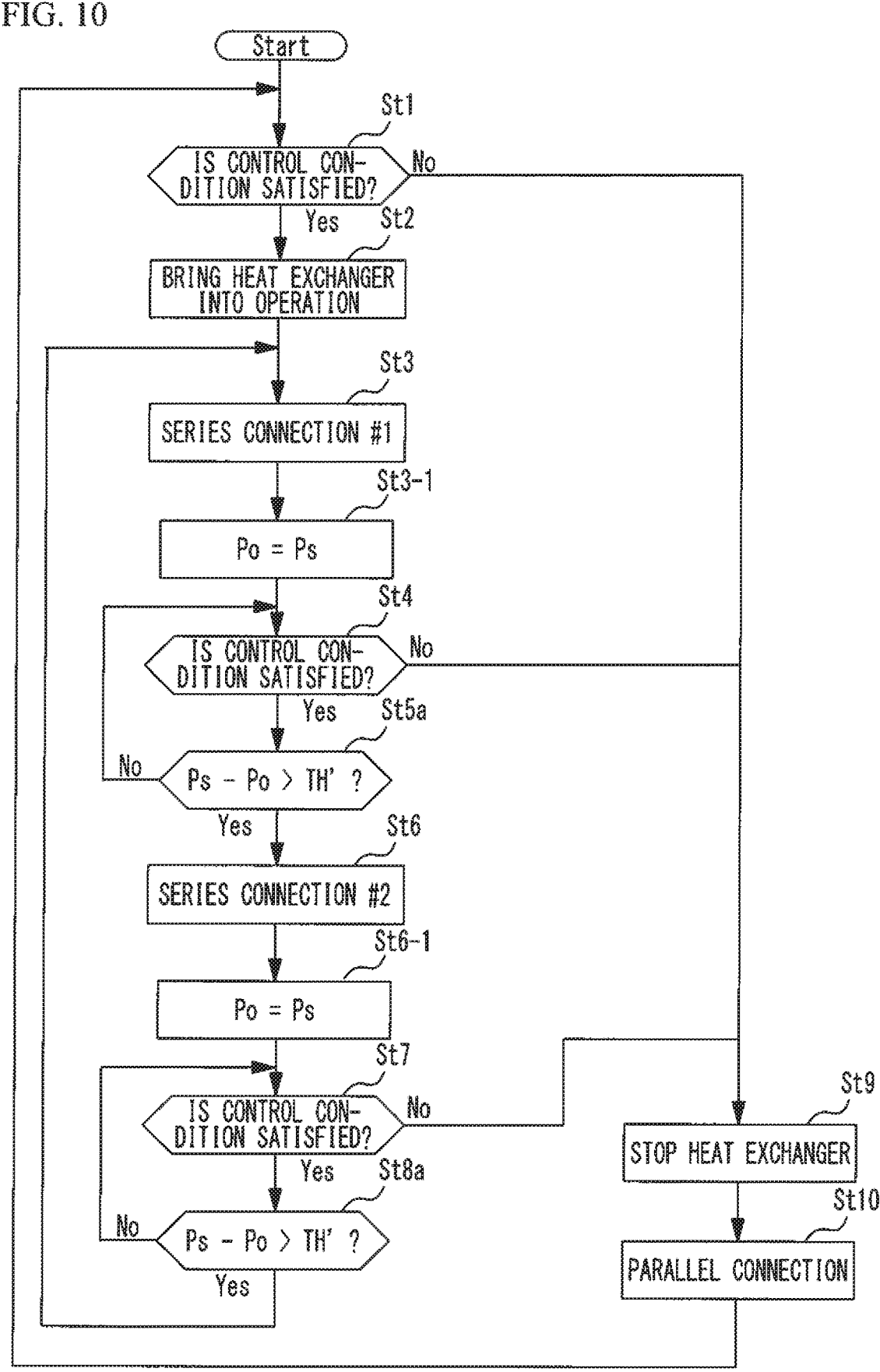
FIG. 10 is a flowchart of another exemplary process executed by the control device during operation of the fuel cell stack.

FIG. 10 is a flowchart of another exemplary process executed by the control device 1 during operation of the fuel cell stack 50. In FIG. 10, the same reference numerals are assigned to the same steps as those in FIG. 7, and the description thereof is omitted.

After switching the connection configuration of the tanks 2a and 2b to the series connection #1 (step St3), the control device 1 obtains the pressure Ps detected by the pressure sensor 64, and stores the obtained pressure Ps as a retention value Po in the memory 11 (step St3-1). When the control condition is satisfied (step St4/Yes), the control device 1 compares the difference (Ps−Po), which is obtained by subtracting the retention value Po from a newly obtained pressure Ps, with a standard value TH' (>0) (step St5a). Hereinafter, the difference (Ps−Po) is referred to as a "pressure difference". The standard value TH' is a pressure value corresponding to, for example, 5° C.

When the pressure difference (Ps−Po) is equal to or less than the standard value TH' (step St5a/No), the control device 1 executes the process of step St4 again.

When the pressure difference (Ps−Po) is greater than the standard value TH' (step St5a/Yes), the control device 1 opens the control valve 3a and closes the control valve 3b to cause the connection configuration of the tanks 2a and 2b to be the series connection #2 (step St6). This reduces decrease in the temperature Ta of the fuel gas in the tank 2a.

As described above, when the decrease amount of the pressure Ps detected by the pressure sensor 64, i.e., the pressure difference (Ps−Po) exceeds the standard value TH' after the control valve 3a is closed and the control valve 3b is opened, the control device 1 opens the control valve 3a and closes the control valve 3b so that the fuel gas flows from the tank 2b into the tank 2a through the heat exchanger 4. Accordingly, the fuel gas heated by the heat exchanger 4 flows into the tank 2a, and the fuel gas in the tank 2a is thereby heated. Thus, decrease in the temperature of the fuel gas in the tank 2a is reduced, and thereby, the formation of the gap 26 in the tank 2a is therefore inhibited.

Then, the control device 1 obtains the pressure Ps detected by the pressure sensor 64, and stores the obtained pressure Ps as the retention value Po in the memory 11 (step St6-1). When the control condition is satisfied (step St7/Yes), the control device 1 compares the pressure difference (Ps−Po) between the newly obtained pressure Ps and the retention value Po with the standard value TH' (step St8a).

When the pressure difference (Ps−Po) is equal to or less than the standard value TH' (step St8a/No), the control device 1 executes the process of step St7 again.

When the pressure difference (Ps−Po) is greater than the standard value TH' (step St8a/Yes), the control device 1 closes the control valve 3a and opens the control valve 3b to cause the connection configuration of the tanks 2a and 2b to be the series connection #1 (step St3). This reduces decrease in the temperature Tb of the fuel gas in the tank 2b. Thereafter, the processes from step St3-1 are executed.

As seen above, when the pressure difference (Ps−Po) exceeds the standard value TH' after the control valve 3a is opened and the control valve 3b is closed, the control device 1 closes the control valve 3a and opens the control valve 3b so that the fuel gas flows from the tank 2a into the tank 2b through the heat exchanger 4. Accordingly, the fuel gas heated by the heat exchanger 4 flows into the tank 2b, and the fuel gas in the tank 2b is thereby heated.

Therefore, the present process has the same advantages as the process illustrated in FIG. 7. The control device 1 obtains the pressure Ps detected by the pressure sensor 64 in each of steps St5a and St8a. In this example, the standard value TH' in step St5a and the standard value TH' in step St8a are assumed to be the same, but may be different from each other.

Yet alternatively, the control device 1 may switch the connection configuration on the basis of the integrated value ΣI of the current values I detected by the current sensor 51 as described in the following example.

Figure 11:
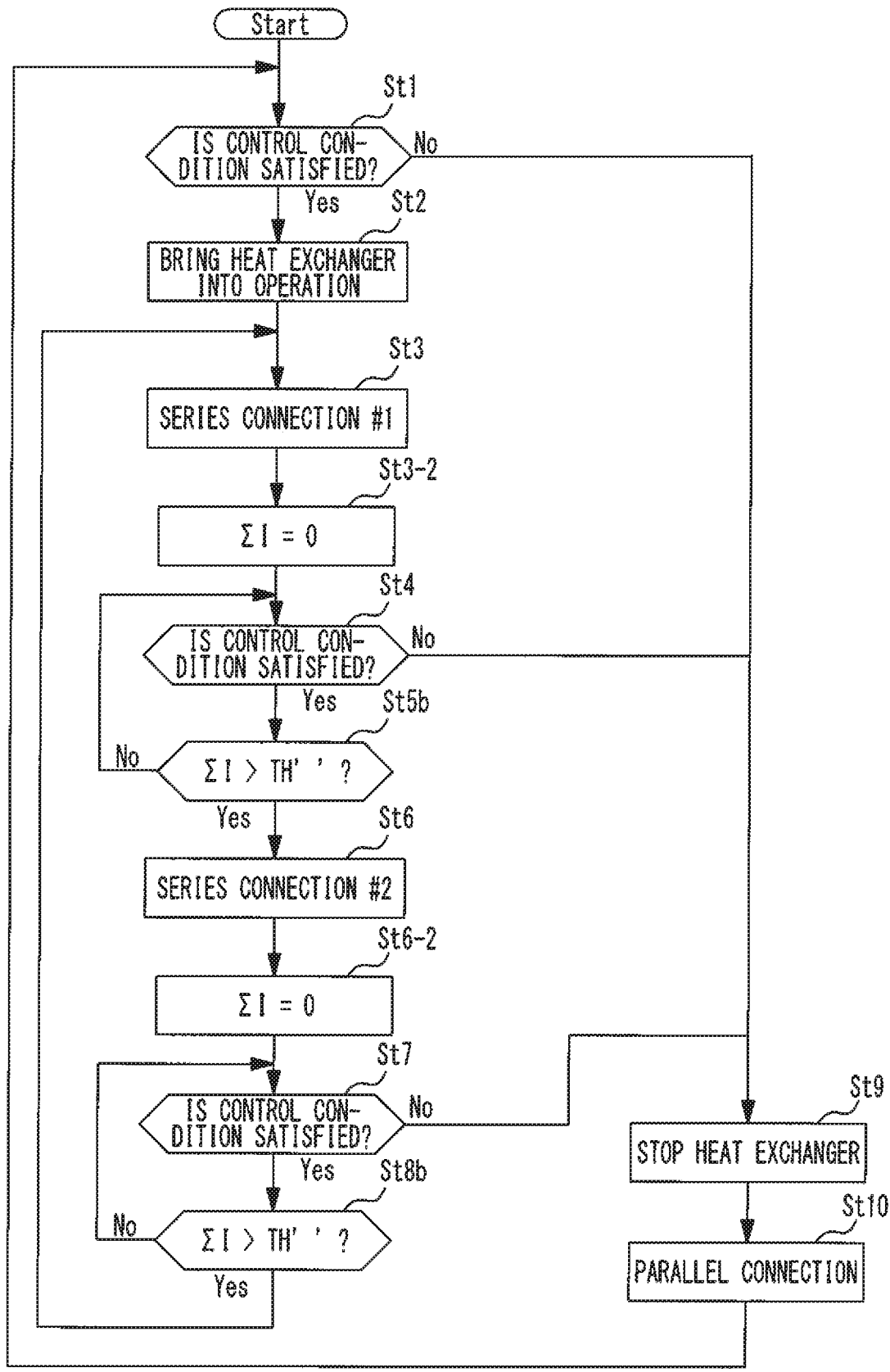
FIG. 11 is a flowchart of another exemplary process executed by the control device during operation of the fuel cell stack.

FIG. 11 is a flowchart of yet another exemplary process executed by the control device 1 during operation of the fuel cell stack 50. In FIG. 11, the same reference numerals are assigned to the same steps as those in FIG. 7, and the description thereof is omitted. In the present example, the control device 1 calculates the integrated value ΣI by obtaining the current value I from the current sensor at constant time intervals and conducting time integration of the obtained current value I.

After switching the connection configuration of the tanks 2a and 2b to the series connection #1 (step St3), the control device 1 resets the integrated value ΣI to 0 (step St3-2). When the control condition is satisfied (step St4/Yes), the control device 1 compares the integrated value ΣI with a standard value TH" (>0) (step St5b). The standard value TH" is an output current corresponding to the pressure value corresponding to, for example, 5° C.

When the integrated value ΣI is equal to or less than the standard value TH" (step St5b/No), the control device 1 executes the process of step St4 again.

When the integrated value ΣI is greater than the standard value TH" (step St5b/Yes), the control device 1 opens the control valve 3a and closes the control valve 3b to cause the connection configuration of the tanks 2a and 2b to be the series connection #2 (step St6). This reduces decrease in the temperature Ta of the fuel gas in the tank 2a.

As seen above, when the integrated value ΣI exceeds the standard value TH" after the control valve 3a is closed and the control valve 3b is opened, the control device 1 opens the control valve 3a and closes the control valve 3b so that the fuel gas flows from the tank 2b to the tank 2a through the heat exchanger 4. Thus, the fuel gas heated by the heat exchanger 4 flows into the tank 2a, and the fuel gas in the tank 2a is thereby heated. Accordingly, decrease in the temperature of the fuel gas in the tank 2a is reduced, and the formation of the gap 26 in the tank 2a is therefore inhibited.

Then, the control device 1 resets the integrated value ΣI to 0 (step St6-2). When the control condition is satisfied (step St7/Yes), the control device 1 compares the integrated value ΣI with the standard value TH" (step St8b).

When the integrated value ΣI is equal to or less than the standard value TH" (step St8b/No), the control device 1 executes the process of step St7 again.

When the integrated value ΣI is greater than the standard value TH" (step St8b/Yes), the control device 1 closes the control valve 3a and opens the control valve 3b to cause the connection configuration of the tanks 2a and 2b to be the series connection #1 (step St3). This reduces decrease in the temperature Tb of the fuel gas in the tank 2b. Thereafter, the processes from step St3-2 are executed.

As seen above, when the integrated value ΣI exceeds the standard value TH" after the control valve 3a is opened and the control valve 3b is closed, the control device 1 closes the control valve 3a and opens the control valve 3b so that the fuel gas flows from the tank 2a into the tank 2b through the heat exchanger 4. Accordingly, the fuel gas heated by the heat exchanger 4 flows into the tank 2b, and the fuel gas in the tank 2b is thereby heated.

Therefore, the present process also has the same advantages as the process illustrated in FIG. 7. The integrated value ΣI in step St5b is obtained by the time integration of the current values I during the time period from step St3-2 to step St5b. The integrated value ΣI in step St8b is obtained by the time integration of the current values I during the time period from step St6-2 to step St8b. The standard values TH" in steps St5b and St8b are assumed to be the same, but may be different.

Second Embodiment

In the first embodiment, the control device 1 conducts the control so that the magnitude relationship between the temperatures of the fuel gases in the tanks 2a and 2b is reversed each time the connection configuration is switched as described with reference to FIG. 8, but this does not intend to suggest any limitation. The control device 1 may conduct the control so that the temperature of the fuel gas in the tank 2b is maintained at a temperature higher than the temperature of the fuel gas in the tank 2a.

In this case, at the time of filling of the fuel gas, the control device 1 starts filling the high-temperature tank 2b prior to filling the low-temperature tank 2a. Then, after the fuel gas in the low-temperature tank 2a is sufficiently heated by external air, the control device 1 starts filling the tank 2a. Thus, it is possible to start filling the tank 2a after waiting for the gap 26 to be reduced by the thermal expansion of the liner 20 of the tank 2a. Therefore, the load on the liner 20 at the time of filling is reduced.

Figure 12:
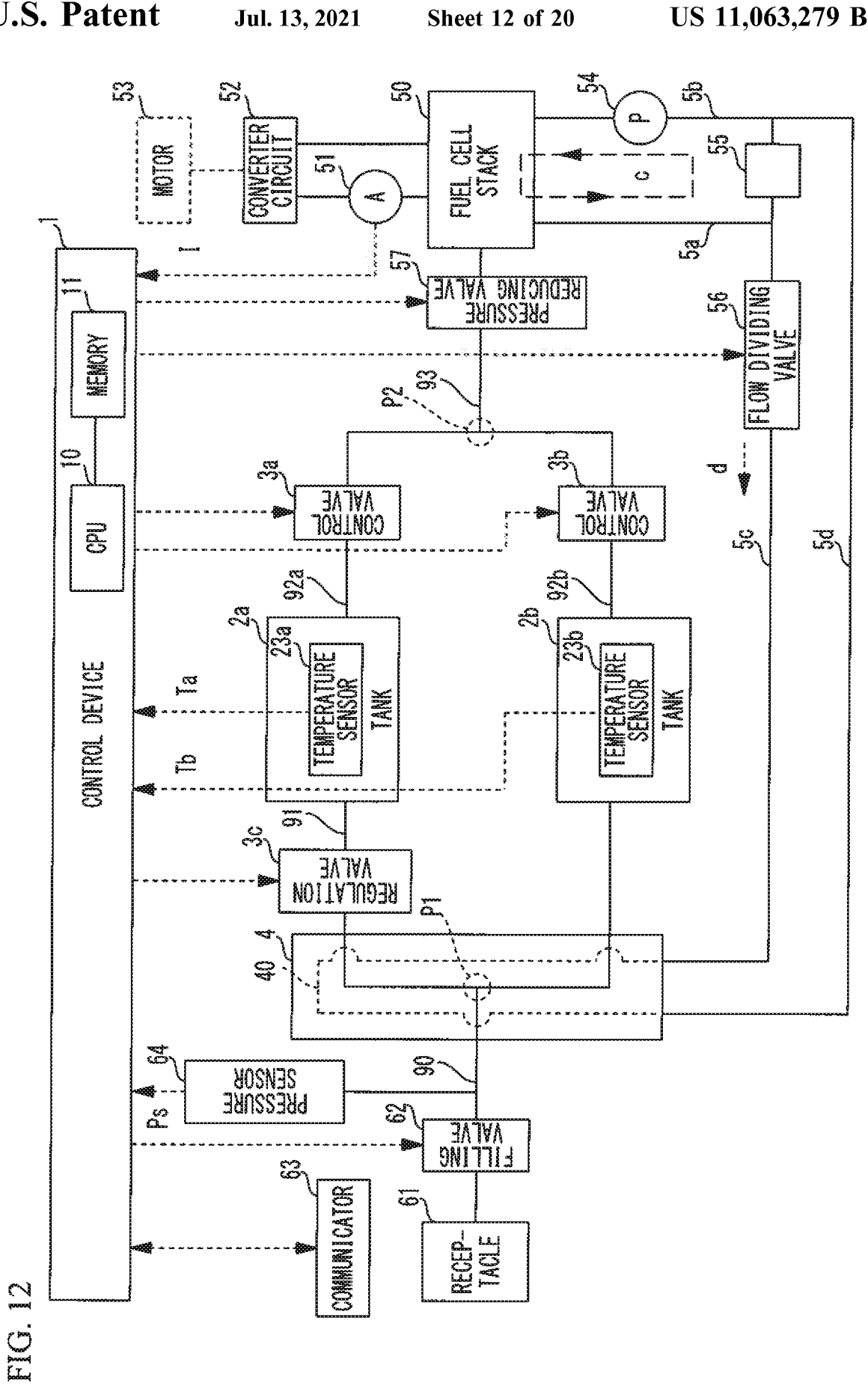
FIG. 12 is a block diagram of a fuel cell system of a second embodiment.

FIG. 12 is a block diagram of a fuel cell system of the second embodiment. In FIG. 12, the same reference numerals are assigned to the same components as those in FIG. 1, and the description thereof is omitted.

In the present embodiment, a regulation valve 3c is disposed in the tank connecting passage 91. The regulation valve 3c is located between the position indicated by reference character P1 and the tank 2a, and opens and closes according to the control by the control device 1. The control device 1 closes the regulation valve 3c in advance at the time of filling, and opens the filling valve 62 to start filling the fuel gas into the tank 2b prior to filling the fuel gas into the tank 2a. When the temperature Ta in the tank 2a detected by the temperature sensor 23a reaches a value at which the load on the liner 20 is sufficiently reduced, the control device 1 opens the regulation valve 3c to start filling the fuel gas into the tank 2a.

Figure 13:
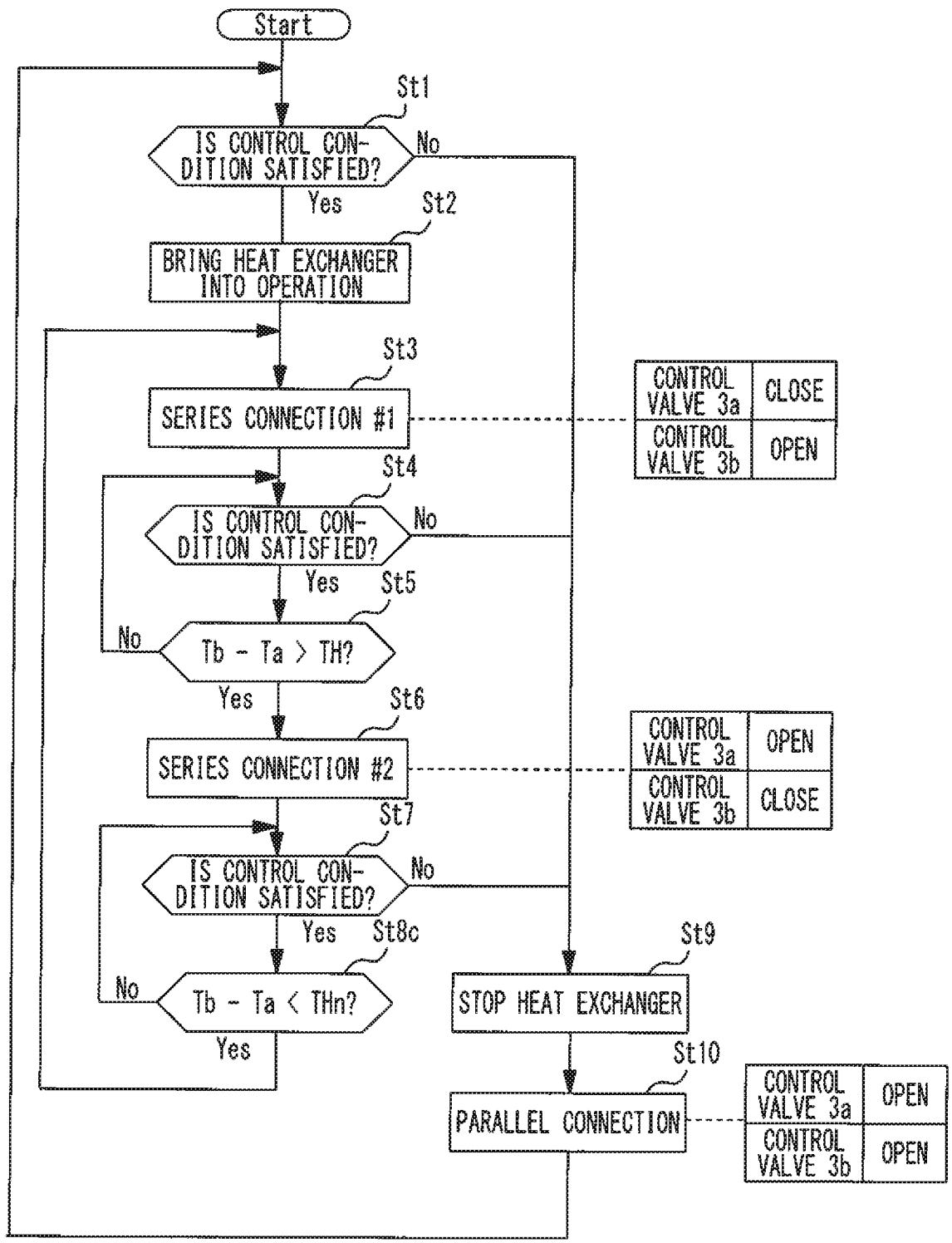
FIG. 13 is a flowchart of an exemplary process executed by the control device during operation of the fuel cell stack.

FIG. 13 is a flowchart of an exemplary process executed by the control device 1 during operation of the fuel cell stack 50. In FIG. 13, the same reference numerals are assigned to the same steps as those in FIG. 7, and the description thereof is omitted. Prior to this process, the control device 1 closes the filling valve 62 and opens the regulation valve 3c.

In the present process, the control device 1 alternately opens and closes the control valves 3a and 3b so that the temperature of the fuel gas in the tank 2a does not become too low while maintaining the temperature of the fuel gas in the tank 2b to be higher than the temperature of the fuel gas in the tank 2a (Tb>Ta).

When the control condition is satisfied (step St7/Yes) after the control device 1 switches the connection configuration of the tanks 2a and 2b to the series connection #2 (step St6), the control device 1 compares the temperature difference (Tb−Ta), which is obtained by subtracting the temperature Ta detected by the temperature sensor 23a in the tank 2a from the temperature Tb detected by the temperature sensor 23b in the tank 2b, with a standard value THn (>0) (step St8c). The standard value THn is an example of a second standard value, and is less than the standard value TH. For example, the standard value THn is 5° C., and the standard value TH is 10° C.

When the temperature difference (Tb−Ta) is equal to or greater than the standard value THn (step St8c/No), the control device 1 executes the process of step St7 again. When the temperature difference (Tb−Ta) is less than the standard value THn (step St8c/Yes), the control device 1 switches the connection configuration of the tanks 2a and 2b to the series connection #1 (step St3). This reduces decrease in the temperature of the fuel gas in the tank 2b.

As described above, when the temperature difference (Tb−Ta) becomes below the standard value THn, which is less than the standard value TH, after the control valve 3a is opened and the control valve 3b is closed, the control device 1 closes the control valve 3a and opens the control valve 3b so that the fuel gas flows from the tank 2a into the tank 2b through the heat exchanger 4. Accordingly, the temperature difference (Tb−Ta) is substantially kept within the range from the standard value THn to the standard value TH.

Therefore, the temperature of the fuel gas in the tank 2b is maintained higher than the temperature of the fuel gas in the tank 2a. Thus, even when the liner 20 of the tank 2a is affected by the temperature decrease, the control device 1 can start filling the fuel gas into the tank 2a after waiting for the gap 26 to be reduced by the thermal expansion of the liner 20 of the tank 2a. Thus, the load on the liner 20 at the time of filling is reduced.

Figure 14:
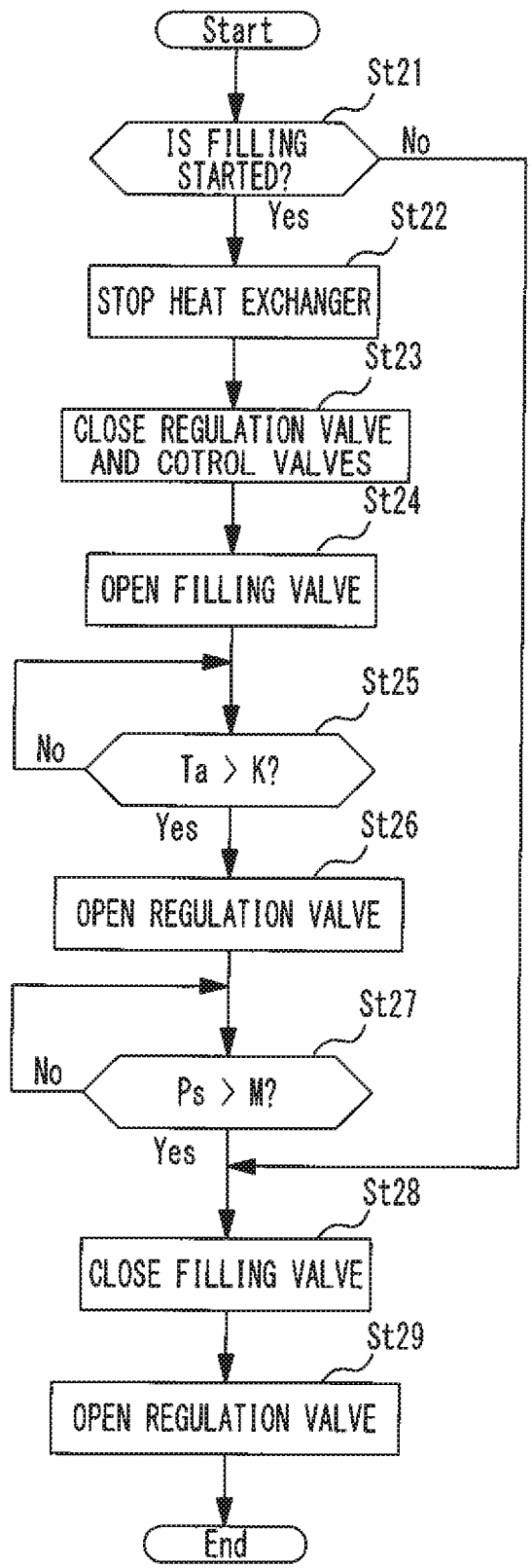
FIG. 14 is a flowchart of an exemplary process executed by the control device during filling of a fuel gas.

FIG. 14 is a flowchart of an exemplary process executed by the control device 1 during filling of the fuel gas. The control device 1 determines whether the filling of the fuel gas is started according to, for example, the communication from the filling device 60 (step St21). When the filling is not started (step St21/No), the control device 1 closes the filling valve 62 (step St28), and opens the regulation valve 3c (step St29).

When the filling is started (step St21/Yes), the control device 1 closes the flow dividing valve 56 to stop the heat exchanger 4 (step St22). Then, the control device 1 closes the regulation valve 3c and the control valves 3a and 3b (step St23).

Then, the control device 1 opens the filling valve 62 (step St24). This step starts the filling of the fuel gas into the tank 2b.

Then, the control device 1 obtains the temperature Ta detected by the temperature sensor 23a in the tank 2a, and compares the obtained temperature Ta with a predetermined value K (step St25). When the temperature Ta is equal to or less than the predetermined value K (step St25/No), the control device 1 executes the process of step St25 again.

When the temperature Ta is greater than the predetermined value K (step St25/Yes), the control device 1 opens the regulation valve 3c (step St26). This starts the filling of the fuel gas into the tank 2a. In this case, the predetermined value K is set at a temperature at which the gap 26 is sufficiently reduced by the thermal expansion of the liner 20 of the tank 2a.

Then, the control device 1 obtains the pressure Ps detected by the pressure sensor 64 and compares the obtained pressure Ps with a predetermined value M to determine whether the filling of the fuel gas to each tank 2a, 2b is completed (step St27). When the pressure Ps is equal to or less than the predetermined value M (step St27/No), the control device 1 executes the process of step St27 again.

When the pressure Ps is greater than the predetermined value M (step St27/Yes), the control device 1 determines that the filling is completed, and closes the filling valve 62 (step St28). In this case, the predetermined value M is set at the pressure Ps obtained when each tank 2a, 2b is full.

Then, the control device 1 opens the regulation valve 3c (step St29). As described above, the control device 1 executes the above process during filling of the fuel gas. The heat exchanger 4 of the fuel cell system in the present embodiment is not limited to the heat exchanger using the cooling water of the fuel cell stack 50, and may be the heat exchanger illustrated in FIG. 9.

Third Embodiment

In the second embodiment, the control device 1 alternately switches the connection configuration of the tanks 2a and 2b to the series connections #1 and #2 so that the temperature of the fuel gas in the tank 2a does not become too low, but this does not intend to suggest any limitation. When the fuel gas is filled into the low-temperature tank 2b after the fuel gas is filled into the high-temperature tank 2a as in the second embodiment, the connection configuration is not necessarily be switched.

Figure 15:
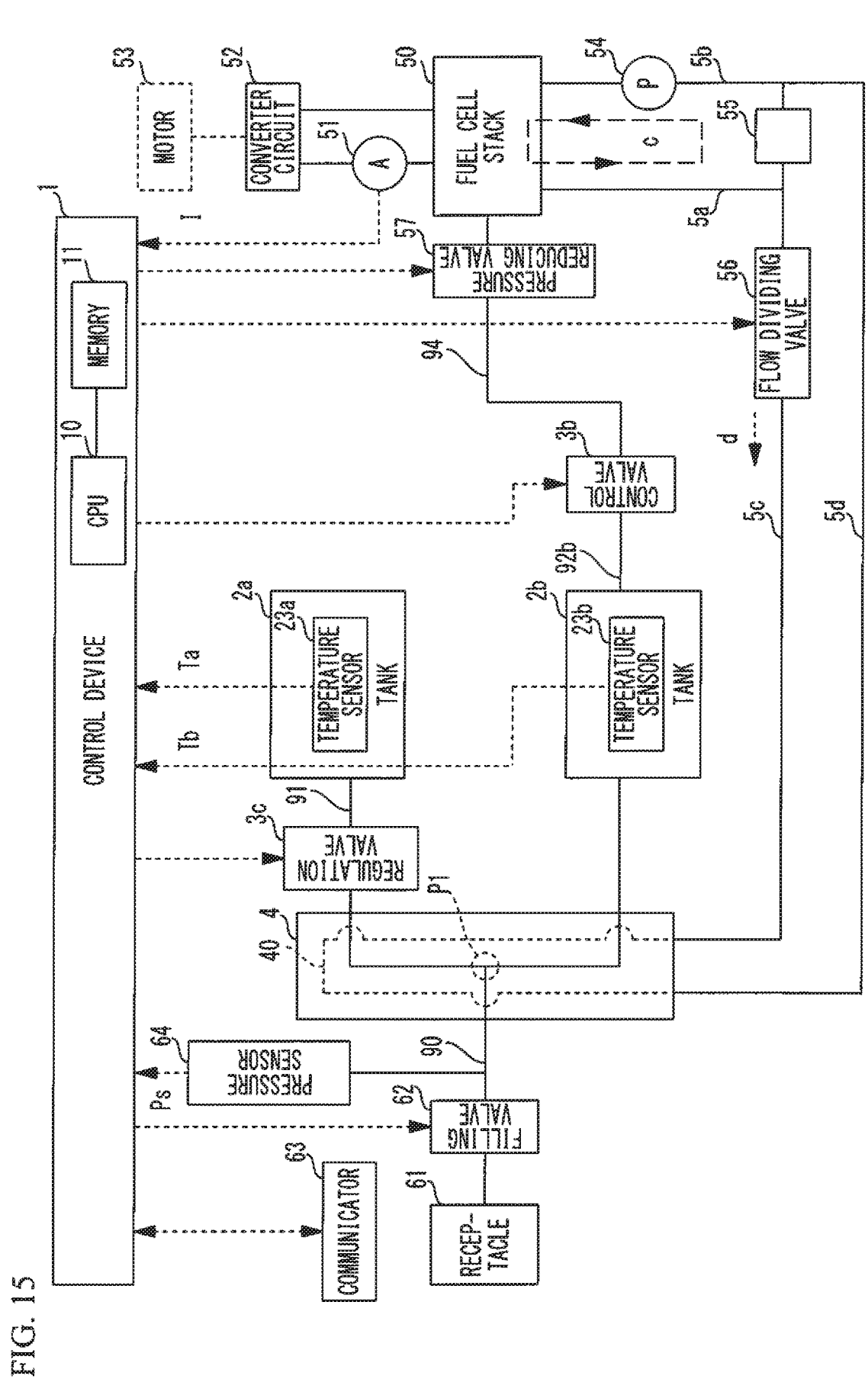
FIG. 15 is a block diagram of a fuel cell system of a third embodiment.

FIG. 15 is a block diagram of a fuel cell system of a third embodiment. In FIG. 15, the same reference numerals are assigned to the same components as those in FIG. 12, and the description thereof is omitted.

When there is no limitation to the temperature difference (Tb−Ta) between the fuel gases in the tanks 2a and 2b, it is sufficient if the temperature Tb of the fuel gas in the tank 2b is simply maintained higher than the temperature Ta of the fuel gas in the tank 2a. Thus, in the fuel cell system of the third embodiment, the control valve 3a and the supply system connecting passage 92a are not provided, and the connection configuration of the tanks 2a and 2b is always the series connection #1. Therefore, the size of the fuel cell system of the third embodiment is smaller than that of the second embodiment. The mouthpiece 25 of the tank 2a is not connected to any component, and is sealed.

The control device 1 controls the operation of the heat exchanger 4 according to the control condition during operation of the fuel cell stack 50, but does not conduct the opening/closing control of the control valve 3b.

Figure 16:
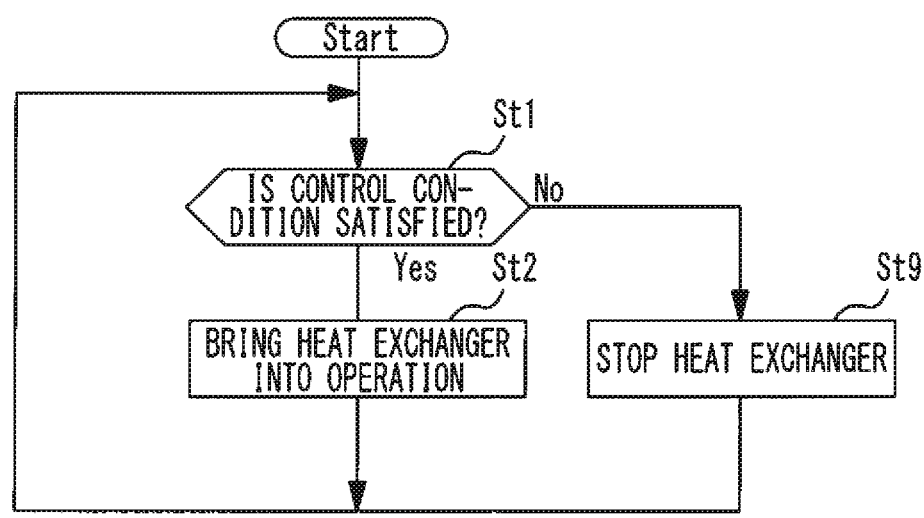
FIG. 16 is a flowchart of an exemplary process executed by the control device during operation of the fuel cell stack.

FIG. 16 is a flowchart of an exemplary process executed by the control device 1 during operation of the fuel cell stack 50. In FIG. 16, the same reference numerals are assigned to the same steps as those in FIG. 7, and the description thereof is omitted.

When the control condition is satisfied (step St1/Yes), the control device 1 brings the heat exchanger 4 into operation (step St2), and when the control condition is not satisfied (step St1/No), the control device 1 stops the operation of the heat exchanger 4 (step St9). Since the connection configuration of the tanks 2a and 2b is always the series connection #1, decrease in the temperature of the fuel gas in the tank 2b is reduced. Thus, the formation of the gap 26 in the tank 2b is inhibited.

However, the control device 1 executes the same process as the process in FIG. 14 during filling of the fuel gas. Therefore, the filling of the fuel gas into the tank 2b starts after the temperature is sufficiently raised, and the load on the liner 20 of the tank 2b is thus reduced. The heat exchanger 4 of the fuel cell system in the present embodiment is not limited to the heat exchanger using the cooling water of the fuel cell stack 50, and may be the heat exchanger illustrated in FIG. 9.

Fourth Embodiment

In the first and second embodiments, the control device 1 reduces the temperature decrease of the fuel gas in each tank 2a, 2b by alternately opening and closing the control valves 3a and 3b. However, the length of the tank 2a in the longitudinal direction Dx may be configured to be shorter than the length of the tank 2b in the longitudinal direction Dx to maintain the temperature of the shorter tank 2a lower than the temperature of the longer tank 2b. In this case, at the time of filling of the fuel gas, the deformation amount of the liner 20 of the shorter tank 2a in the longitudinal direction Dx becomes less than that of the longer tank 2b in the longitudinal direction Dx. Thus, the load is reduced.

Figure 17:
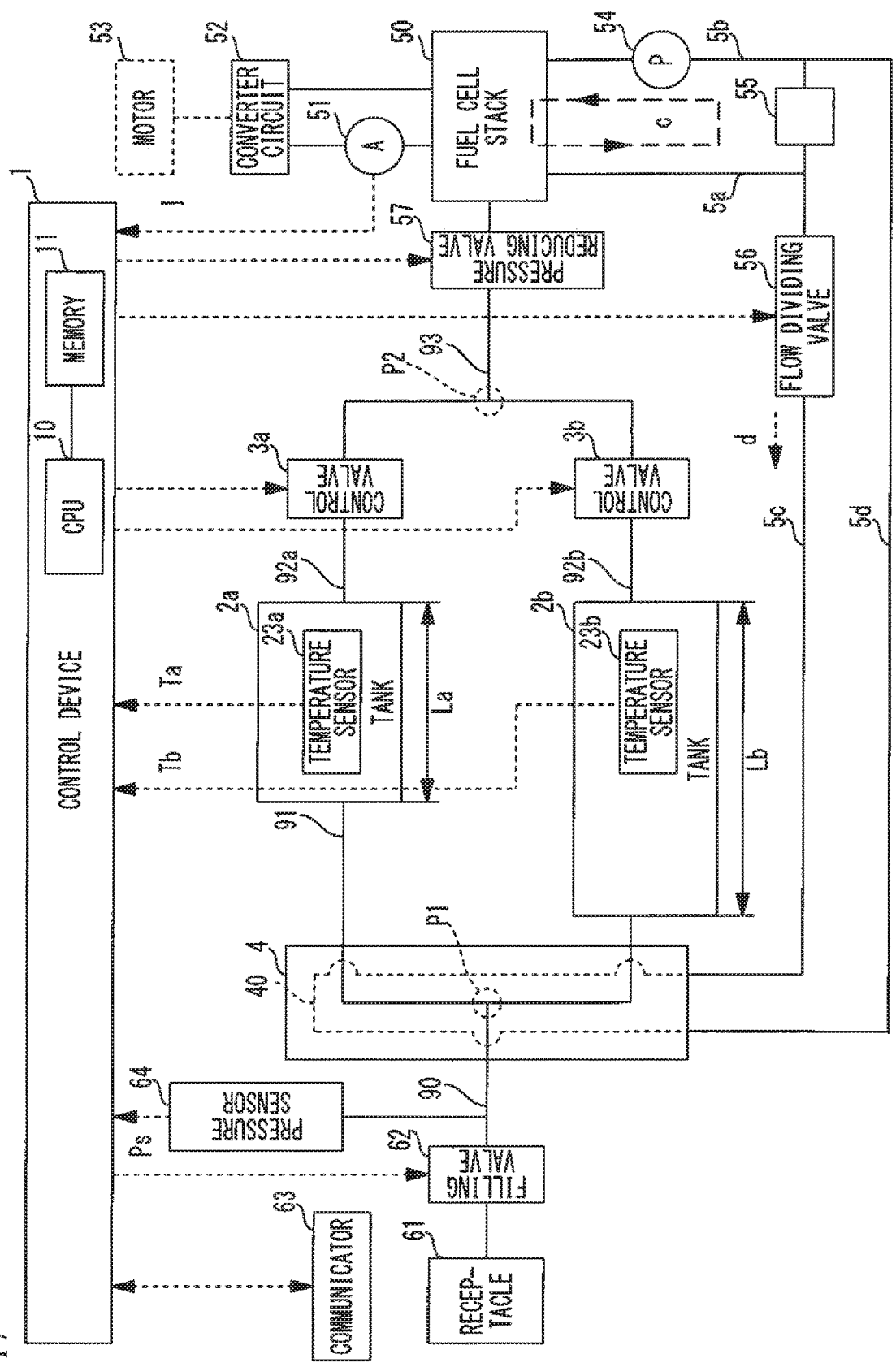
FIG. 17 is a block diagram of a fuel cell system of a fourth embodiment.

FIG. 17 is a block diagram of a fuel cell system of a fourth embodiment. In FIG. 17, the same reference numerals are assigned to the same components as those in FIG. 1, and the description thereof is omitted. In the present embodiment, the length La of the tank 2a in the longitudinal direction Dx is shorter than the length Lb of the tank 2b in the longitudinal direction Dx.

Figure 18:
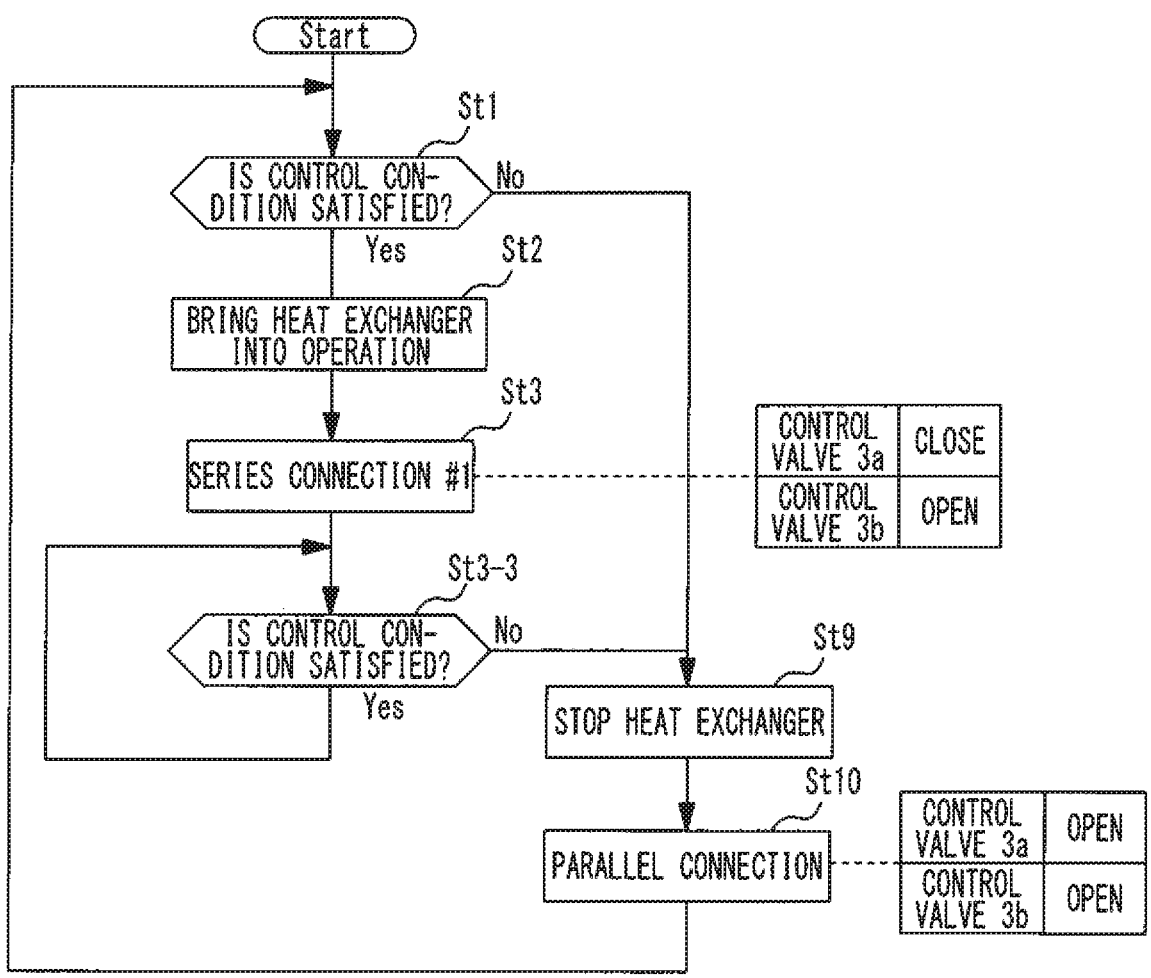
FIG. 18 is a flowchart of an exemplary process executed by the control device during operation of the fuel cell stack.

FIG. 18 is a flowchart of an exemplary process executed by the control device 1 during operation of the fuel cell stack 50. In FIG. 18, the same reference numerals are assigned to the same steps as those in FIG. 7, and the description thereof is omitted.

When the control condition is satisfied (step St1/Yes), the control device 1 brings the heat exchanger 4 into operation (step St2) and causes the connection configuration of the tanks 2a and 2b to be the series connection #1 (step St3). Then, the control device 1 determines again whether the control condition is satisfied (step St3-3).

When the control condition is satisfied (step St3-3/Yes), the control device 1 executes the process of step St3-3 again, and when the control condition is not satisfied (step St3-3/No), the control device 1 executes the processes of steps St9 and St10.

As seen above, the control device 1 switches the connection configuration from the parallel connection to the series connection #1, but does not switch the connection configuration to the series connection #2 unlike the control device 1 of the first and second embodiments. Therefore, decrease in the temperature of the fuel gas in the tank 2b is reduced, but decrease in the temperature of the fuel gas in the tank 2a is not reduced.

However, the length La of the tank 2a in the longitudinal direction Dx is shorter than the length Lb of the tank 2b in the longitudinal direction Dx. Thus, at the time of filling of the fuel gas, the deformation amount of the liner 20 of the shorter tank 2a in the longitudinal direction Dx is less than the deformation amount of the liner 20 of the longer tank 2b in the longitudinal direction Dx. Therefore, the load is reduced. The heat exchanger 4 of the fuel cell system in the present embodiment is not limited to the heat exchanger using the cooling water of the fuel cell stack 50, and may be the heat exchanger illustrated in FIG. 9.

Fifth Embodiment

Unlike the fourth embodiment, the connection configuration of the tanks 2a and 2b may be always the series connection #1.

Figure 19:
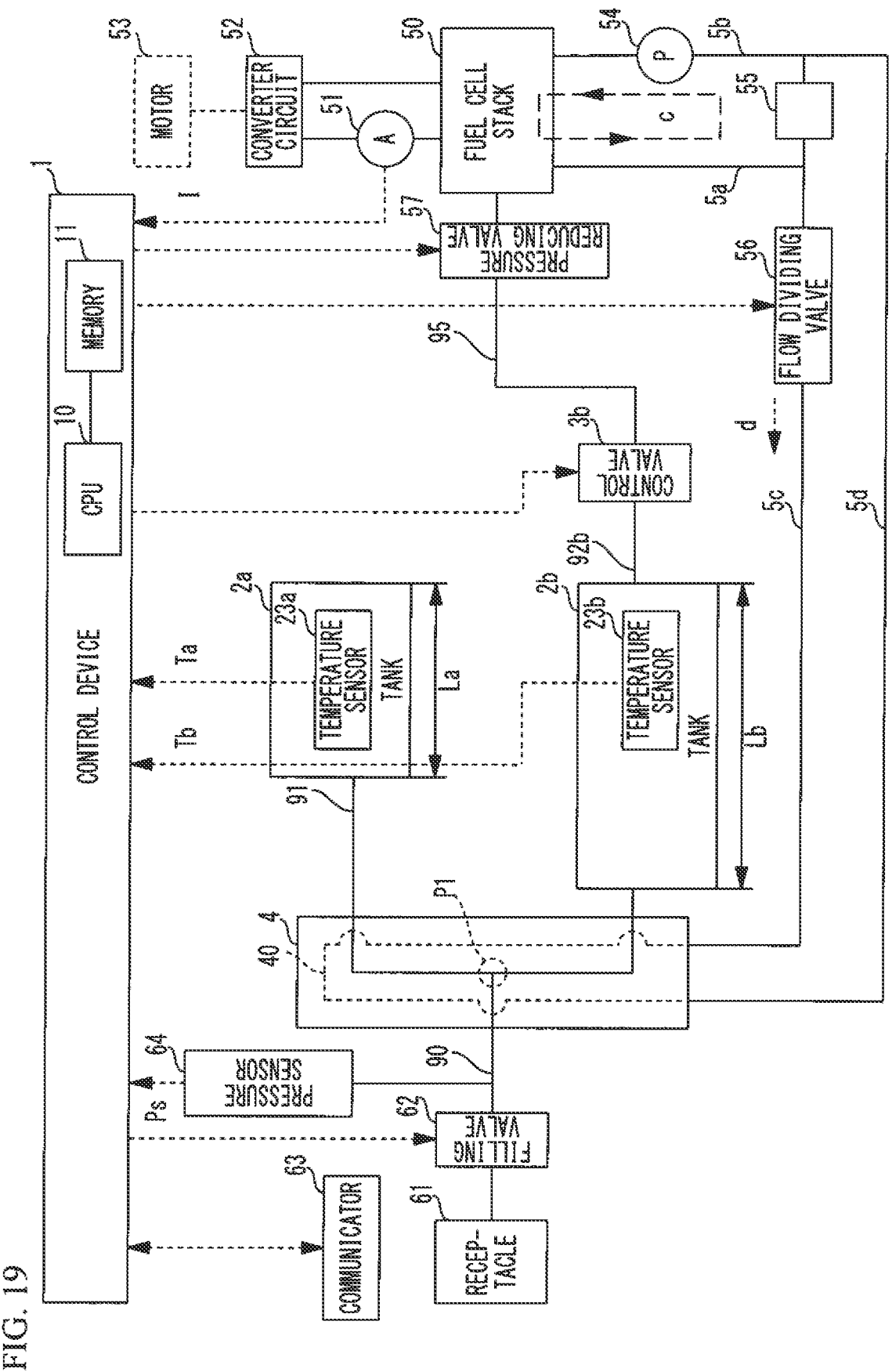
FIG. 19 is a block diagram of a fuel cell system of a fifth embodiment.

FIG. 19 is a block diagram of a fuel cell system of a fifth embodiment. In FIG. 19, the same reference numerals are assigned to the same components as those in FIG. 17, and the description thereof is omitted.

In the fuel cell system of the present embodiment, it is sufficient if the fuel gas always flows from the tank 2a to the tank 2b through the heat exchanger 4 during operation of the fuel cell stack 50. Thus, the control valve 3a and the supply system connecting passage 92a are not provided. Therefore, the size of the fuel cell system is smaller than that in the fourth embodiment. The mouthpiece 25 of the tank 2a is not connected to any component, and is sealed.

FIG. 20 illustrates the open/close state of the control valve 3b and the filling valve 62. At the time of filling the fuel gas into the tanks 2a and 2b, the control device 1 closes the control valve 3b and opens the filling valve 62. Since the load on the liner 20 of the tank 2a at the time of filling is reduced, the control device 1 can substantially simultaneously start filling the fuel gas into the tanks 2a and 2b unlike the second embodiment and the third embodiment.

During operation of the fuel cell stack 50, the control device 1 opens the control valve 3b and closes the filling valve 62. Since the connection configuration of the tanks 2a and 2b is always the series connection #1, the fuel gas flows from the tank 2a to the tank 2b through the heat exchanger 4. At this time, since the control device 1 executes the same control as in FIG. 16, the fuel gas heated by the heat exchanger 4 flows into the tank 2b. Thus, decrease in the temperature of the fuel gas in the tank 2b is reduced, and the formation of the gap 26 is thereby inhibited.

In addition, the temperature of the fuel gas in the tank 2a becomes less than the temperature of the fuel gas in the tank 2b (Ta<Tb). However, at the time of filling of the fuel gas, the deformation amount of the liner 20 of the shorter tank 2a in the longitudinal direction Dx becomes less than the deformation amount of the liner 20 of the longer tank 2b in the longitudinal direction Dx. Thus, the load is reduced. The heat exchanger 4 of the fuel cell system in the present embodiment is not limited to the heat exchanger using the cooling water of the fuel cell stack 50, and may be the heat exchanger illustrated in FIG. 9.

In the present embodiment, the deformation of the liner 20 of the tank 2a is inhibited by making the respective lengths La and Lb of the tanks 2a and 2b different. However, the deformation can be also reduced by configuring the liner 20 of the tank 2a to be made of a metal such as, but not limited to, Al, Cu, Ni, Ag, steel use stainless (SUS), Ti, or an alloy of these metals. The heat exchanger 4 of the fuel cell system in the present embodiment is not limited to the heat exchanger using the cooling water of the fuel cell stack 50, and may be the heat exchanger illustrated in FIG. 9.

The above-described embodiments describe the fuel cell systems each including two tanks 2a and 2b, but do not intend to suggest any limitation. The above-described control process may be executed in a fuel cell system including three or more tanks.

Although some embodiments of the present disclosure have been described in detail, the present disclosure is not limited to the specific embodiments but may be varied or changed within the scope of the present disclosure as claimed.

What is claimed is:

1. A fuel cell system comprising:
a first tank and a second tank each accumulating a fuel gas to be supplied to a fuel cell;
a heating device disposed in a passage connecting the first tank and the second tank; and
a controller configured to bring the heating device into operation so that the fuel gas flowing from one of the first tank and the second tank to the other of the first tank and the second tank through the heating device is heated when a condition for a temperature of the fuel gas in the first tank or a condition for a temperature of the fuel gas in the second tank is satisfied.

2. The fuel cell system according to claim 1, wherein the controller is configured to:
when the condition for the temperature of the fuel gas in the first tank and the condition for the temperature of the fuel gas in the second tank are not satisfied, switch a supply path of the fuel gas to the fuel cell to a path along which the fuel gas flows from the first tank and the second tank to the fuel cell without passing through the heating device, and stop operation of the heating device, and
when the condition for the temperature of the fuel gas in the first tank or the condition for the temperature of the fuel gas in the second tank is satisfied, switch the supply path to a path along which the fuel gas flows from one of the first tank and the second tank to the other of the first tank and the second tank through the heating device and reaches the fuel cell, and bring the heating device into operation.

3. The fuel cell system according to claim 1, further comprising:
a first control valve disposed in a passage that supplies the fuel gas from the first tank to the fuel cell without passing through the heating device; and
a second control valve disposed in a passage that supplies the fuel gas from the second tank to the fuel cell without passing through the heating device,
wherein the controller is configured to,
when the condition for the temperature of the fuel gas in the first tank and the condition for the temperature of the fuel gas in the second tank are not satisfied, open the first control valve and the second control valve, and
when the condition for the temperature of the fuel gas in the first tank or the condition for the temperature of the fuel gas in the second tank is satisfied, close the first control valve and open the second control valve so that the fuel gas flows from the first tank to the second tank through the heating device.

4. The fuel cell system according to claim 3, further comprising:
a first temperature sensor configured to detect a first temperature of the fuel gas in the first tank; and
a second temperature sensor configured to detect a second temperature of the fuel gas in the second tank,
wherein the controller is configured to, when a temperature difference, which is obtained by subtracting the first temperature from the second temperature, exceeds a first standard value after the first control valve is closed and the second control valve is opened, open the first control valve and close the second control valve so that the fuel gas flows from the second tank to the first tank through the heating device.

5. The fuel cell system according to claim 4, wherein the controller is configured to, when a temperature difference, which is obtained by subtracting the second temperature from the first temperature, exceeds the first standard value after the first control valve is opened and the second control valve is closed, close the first control valve and open the second control valve so that the fuel gas flows from the first tank to the second tank through the heating device.

6. The fuel cell system according to claim 4, wherein the controller is configured to, when the temperature difference, which is obtained by subtracting the first temperature from the second temperature, becomes below a second standard value after the first control valve is opened and the second control valve is closed, close the first control valve and open the second control valve so that the fuel gas flows from the first tank to the second tank through the heating device, the second standard value being less than the first standard value.

7. The fuel cell system according to claim 3, further comprising
a pressure sensor detecting a pressure of the fuel gas in the first tank and the second tank,
wherein the controller is configured to, when an amount of decrease in a pressure detected by the pressure sensor exceeds a standard value after the first control valve is closed and the second control valve is opened, open the first control valve and close the second control valve so that the fuel gas flows from the second tank to the first tank through the heating device.

8. The fuel cell system according to claim 7, wherein the controller is configured to, when the amount of decrease in the pressure detected by the pressure sensor exceeds the standard value after the first control valve is opened and the second control valve is closed, close the first control valve and open the second control valve so that the fuel gas flows from the first tank to the second tank through the heating device.

9. The fuel cell system according to claim 3, further comprising
a current sensor that detects a current value output from the fuel cell,
wherein the controller is configured to, when an integrated value of the current value detected by the current sensor exceeds a standard value after the first control valve is closed and the second control valve is opened, open the first control valve and close the second control valve so that the fuel gas flows from the second tank to the first tank through the heating device.

10. The fuel cell system according to claim 9, wherein the controller is configured to, when the integrated value of the current value detected by the current sensor exceeds the standard value after the first control valve is opened and the second control valve is closed, close the first control valve and open the second control valve so that the fuel gas flows from the first tank to the second tank through the heating device.

11. The fuel cell system according to claim 1, wherein the controller is configured to, when the temperature of the fuel gas in the first tank or the temperature of the fuel gas in the second tank is equal to or less than a threshold value corresponding to a remaining amount of the fuel gas, determine that the condition is satisfied.

12. The fuel cell system according to claim 1, wherein the controller is configured to, when a consumption rate of the fuel gas in the first tank or a consumption rate of the fuel gas in the second tank is equal to or less than a threshold value corresponding to a remaining amount of the fuel gas, determine that the condition is satisfied.

13. The fuel cell system according to claim 1, wherein
each of the first tank and the second tank includes a liner made of resin,
each of the first tank and the second tank has a shape extending in one direction, and
a length of the first tank in the one direction is greater than a length of the second tank in the one direction.

14. The fuel cell system according to claim 1, wherein
the first tank includes a liner made of metal, and
the second tank includes a liner made of resin.

15. The fuel cell system according to claim 1, wherein the heating device is a heat exchanger including a cooling passage through which a cooling medium that has cooled the fuel cell flows.

16. The fuel cell system according to claim 1, wherein the heating device is a heat exchanger including a fan and a fin.

* * * * *